United States Patent
Mandel et al.

(10) Patent No.: US 12,388,310 B2
(45) Date of Patent: Aug. 12, 2025

(54) THERMAL MANAGEMENT SYSTEM AND METHOD FOR IN-SLOT COOLING OF ELECTRIC MOTORS

(71) Applicants: UNIVERSITY OF MARYLAND, COLLEGE PARK, College Park, MD (US); UNIVERSITY OF WISCONSIN-MADISON, Madison, WI (US)

(72) Inventors: Raphael Kahat Mandel, West Hartford, CT (US); F. Patrick Mccluskey, Ellicott City, MD (US); Zhaoxi Yao, College Park, MD (US); Thomas Jahns, Madison, WI (US); Bulent Sarlioglu, Madison, WI (US); James Swanke, Edina, MN (US); Dheeraj Bobba, Madison, WI (US)

(73) Assignees: University of Maryland, College Park, College Park, MD (US); University of Wisconsin-Madison, Madison, WI (US)

( * ) Notice: Subject to any disclaimer, the term of this patent is extended or adjusted under 35 U.S.C. 154(b) by 714 days.

(21) Appl. No.: 17/644,629

(22) Filed: Dec. 16, 2021

(65) Prior Publication Data
US 2022/0190664 A1    Jun. 16, 2022

Related U.S. Application Data

(60) Provisional application No. 63/126,479, filed on Dec. 16, 2020.

(51) Int. Cl.
*H02K 3/24* (2006.01)
*H02K 9/193* (2006.01)

(52) U.S. Cl.
CPC ............... *H02K 3/24* (2013.01); *H02K 9/193* (2013.01)

(58) Field of Classification Search
CPC .................................................... H02K 3/24
(Continued)

(56) References Cited

U.S. PATENT DOCUMENTS

| 2010/0072834 A1* | 3/2010 | Crane | H02K 5/20 310/71 |
| 2017/0141654 A1* | 5/2017 | Bodla | H02K 9/225 |

FOREIGN PATENT DOCUMENTS

DE         102014223421 A1 *   5/2016    ............... H02K 1/20

OTHER PUBLICATIONS

Bezner (DE 102014223421 A1) English Translation (Year: 2016).*

* cited by examiner

*Primary Examiner* — Tulsidas C Patel
*Assistant Examiner* — Robert E Mates
(74) *Attorney, Agent, or Firm* — Rosenberg, Klein & Lee

(57) ABSTRACT

The thermal management system for in-slot cooling of electric motors includes separating structures, either in the form of a scaffolding structure or a monolithic winding structure which is placed in between the adjacent winding turns to physically separate the winding turns to define coolant fluid passages for circulation of a coolant fluid in direct contact with the lateral surfaces of the winding turns. The scaffolding and monolithic winding structures are made from an electrically insulating material and are filled with a dielectric fluid that serves both the coolant and the electrical insulator between the winding turns. An end-winding organizer may be positioned at two end regions of each stator tooth to provide a curved surface for the winding turns to be held in tension throughout the 180° winding end turns and is formed with grooves to define the passage for the coolant flow to ensure that the flowing coolant reaches the surface of the innermost winding turns.

14 Claims, 15 Drawing Sheets

(58) Field of Classification Search
USPC .......................................................... 310/215
See application file for complete search history.

THERMAL MANAGEMENT SYSTEM AND METHOD FOR IN-SLOT COOLING OF ELECTRIC MOTORS

STATEMENT REGARDING FEDERAL SPONSORED RESEARCH OR DEVELOPMENT

This invention was made with Government support under NNX17AJ92A awarded by the National Aeronautics and Space Administration. The Government has certain rights in the invention.

REFERENCE TO THE RELATED APPLICATION(S)

This Utility Patent Application is based on the Provisional Patent Application No. 63/126,479 filed on 16 Dec. 2020, which hereby is incorporated by reference in its entirety.

FIELD

The present disclosure addresses electric motors, and more particularly, relates to systems, devices, and methods for cooling electric motors.

The present disclosure further addresses a thermal management technique for in-slot cooling of electric motors by means of uniquely shaped separating (spacing) structures placed between the winding turns of the electric motor stator for physical separation of the winding turns to form therebetween continuous passages for a coolant circulation in direct contact with each winding turn, thus maximizing the contact area between the coolant and the windings to enhance the cooling of the electric motors.

Further, in particular, the present disclosure addresses a thermal management system for cooling electric motors which utilizes spacing structures which may be fabricated in various shapes from an electrically insulating material and which are disposed between adjacent winding turns, preferably, in contact with both surfaces of each winding turn, to form a continuous channel therebetween filled with a dielectric fluid that serves as both a coolant and an electrical insulator between adjacent winding turns. Such arrangement provides a fluid flow path through each stator slot with a maximum fluid contact area with the winding turns and minimal heat conduction path through low conductivity insulation layers.

The present disclosure also addresses a thermal management system for in-slot cooling of electric motors utilizing spacing structures having a scaffolding configuration which are placed between winding turns to provide structural integrity for the stator windings and to maintain a physical separation between the adjacent winding turns.

Furthermore, the present disclosure addresses a thermal management system for in-slot cooling of electric motors where a physical separation between the winding turns is achieved by a monolithic (one-piece) winding turns separating structure which supports a continuous coolant fluid passage between adjacent winding turns. Such a monolithic separating structure enables an easy manipulation for placement and retainment of the windings during the stator assembly.

In addition, the present disclosure addresses a thermal management system for in-slot cooling of electric motors where a separating structure is placed between adjacent winding turns which can provide high voltage stand-off with minimum partial discharge by using a dielectric fluid as a coolant to increase the dielectric stand-off capability between winding turns so that the insulation layer thickness around the winding strands can be reduced.

The present disclosure also addresses a thermal management system for in-slot cooling of electric motors, which includes an end winding organizer assembly configured with a mechanical guiding of jump turns from one layer to an adjacent layer of the windings, shaped with an array of grooves serving as a scaffolding structure to direct the coolant fluid to circulate along the inside surfaces of the winding turns that are in a direct contact with the end winding organizers mounted at the two ends (also referred to herein as end winding regions) of each stator tooth, and which provides an entrance portal and an exit portal, with the entrance portal for the coolant fluid to enter into an end winding region of a stator winding to flow down the length of the slot to the exit portal to exit at the opposite end of the stator winding.

BACKGROUND

Electric motors have assumed a major role in sustainable development. Compared to a traditional combustion engine, an electric motor has a significantly higher efficiency, as well as diminished emissions and acoustic noise. The reduced fuel consumption and potentially lower operational cost of electric motors have drawn attention from both academics and industry.

In numerous applications, for example, concerning electrified aerial and terrestrial vehicles, the weight and volume of the motors are of great importance. The need for dense packaging renders thermal management to be one of the major challenges in such applications. The thermal management system that cools motors must be able to maintain the temperatures of all components below their respective limits for safe and reliable operation under all conditions. In addition, the thermal management system itself should be effective, reliable, and light-weight with minimal waste heat resulting in a low input power requirement (i.e., the high coefficient of performance).

A traditional electric motor includes a stator and a rotor. The stator typically is built with three sets of windings to form a three-phase winding configuration. The rotor typically has either permanent magnets, electromagnets, short-circuited rotor bar conductors, or some other means of interacting with the stator-induced magnetic field to produce torque.

In high-speed, high-power motors, the stator windings, being subjected to high voltage and high current amplitudes, generate a substantial amount of heat, and require strong electrical insulation. However, in general, strong electrical insulation results in strong thermal insulation that prevents heat removal from the stator windings. In addition, as the motor torque increases during the motor operation, the heat loss in the stator winding increases faster than the torque. Conventional cooling techniques are not sufficient to overcome the heat associated problems in electric motors, and cooling requirements become a major barrier to further increasing the machine's torque production capabilities.

The current cooling technologies treat either the whole stator or all the winding turns around one stator tooth as a monolithic structure, applying cooling only along its outer surface. Such an approach cannot provide sufficient cooling for high-power motors, owing to substantial electrical insulation with low thermal conductivity being present in the heat removal path. As a result, the windings become extremely hot at high current levels due to the elevated thermal resistance from the interior of the winding coil to its outer surface that is in contact with the coolant.

In addition, the cooling performance of the conventional technologies is limited due to the high thermal resistance of the wire insulation around each wire strand that is needed to prevent partial discharge and eventual short-circuiting between adjacent turns.

Nowadays, the use of hollow conductors with a coolant fluid flowing through the winding's interior cavity is considered to be one of the best-known alternatives to the in-slot cooling technique. However, this approach is subject to at least two significant disadvantages: (a) the hollow conductors are used in the form of solid copper tubes that are vulnerable to high AC losses at high excitation frequencies that can significantly raise the losses in the stator windings far above their values at low frequencies, resulting in a drop of machine efficiency by several percentage points, and (b) the pressure drop needed to force sufficient coolant circulation through the full length of the hollow stator coil (winding) tends to be very high and requires large pumps with high losses in the cooling system to support the hollow conductor cooling technique.

It therefore would be highly desirable to provide effective cooling for electric motors which would be free of the shortcomings of the conventional cooling techniques, and which would be capable of a significant reduction of the stator winding temperature rise through the provision of an enhanced contact between a coolant and a high percentage of the heat-dissipating surfaces associated with each stator winding.

SUMMARY

It is therefore an object of the present disclosure to provide a technique for effective cooling of electric motors by the provision of a coolant circulation in direct contact with a high percentage of the heat-dissipating surfaces associated with the stator windings to reduce their thermal stress.

It is another object of the present disclosure to ensure an effective cooling of electric motors through provisioning of numerous interior fluid pathways inside the stator windings for a coolant fluid circulation between heat-dissipating surfaces achieved by installation of separating (spacing) structures for physically separating adjacent winding turns and providing continuous (unblocked) passages therebetween for the coolant fluid in contact with individual winding turns in a stator of an electric motor.

It is an additional object of the present disclosure to provide a thermal management system for in-slot cooling of electric motors which utilizes a system of separating (spacing) structures, for example, in the configuration of a scaffolding structure, or a monolithic (one-piece) spacer, fabricated from an electrically insulating material and having a volume filled with a dielectric fluid that serves both as a coolant and the electrical insulator when circulating between adjacent winding turns. Such arrangement reduces the required thickness of the insulating material around each winding wire strand which is beneficial for reducing the strand's thermal resistance, resulting in improved effectiveness of the cooling technique.

It is still an object of the present disclosure to provide a highly efficient thermal management system for in-slot cooling of electric motors which is applicable to various types of stator windings, for example, the windings formed with Litz wire, to reduce the AC losses to a negligible level, and where the pressure drop needed to force sufficient coolant circulation through the full length of the stator windings is low and does not require large pumps to support the cooling technique.

In one aspect, the subject matter constitutes a thermal management system for cooling electric motors, comprising elongated spacing structures disposed between winding turns of a stator winding and separating one winding turn from another to define coolant fluid passages between them. The coolant fluid passages extend continuously along substantially an entire lateral surface of each of the winding turns.

A dielectric coolant fluid circulates along coolant fluid passages between winding turns in contiguous contact with the lateral surface of the winding turns.

The elongated spacing structure may have a scaffolding configuration formed with longitudinal first bars and a plurality of second bars extending in an angular relationship with longitudinal first bars and connected thereto. The second bars may cross the longitudinal first bars at 90 degrees.

The longitudinal first bars are arranged in a first plane, and the plurality of second bars are arranged in a second plane which is different than the first plane. The first and second bars define an array of openings which provide a continuous path for a flow of the dielectric coolant fluid between the winding turns in contiguous contact with the lateral surface of each winding turn.

Alternatively, the elongated spacing structure is configured with a base frame and a plurality of first and second tabs extending in spaced apart relationship with one another and in opposite direction from the base frame. The first tabs are disposed in an alternating relationship with the second tabs in an integral coupling with the base frame.

The first tabs define a first tier, while the second tabs define a second tier. The stator winding is arranged in at least a first layer and at least a second layer with the first layer being positioned in the first tier, and the second layer positioned in the second tier. Each of the first and second layers accommodate at least two winding turns. The two winding turns in each of the first and second layers are separated by respective first and second tabs.

The elongated spacing structures are fabricated from an electrically insulating material. Preferably, the elongated spacing structures having a scaffolding configuration are disposed at both surfaces of each of the winding turns of the stator winding.

The spacing structure may also be sandwiched between a surface of the stator tooth and the winding turns, thereby forming a dielectric coolant passage therebetween.

The subject system further includes a pair of end-winding organizer members, each attached to a respective one of two opposite ends of the stator teeth where the end windings are located. The end-winding organizer members are configured with a supporting bottom member, an upper member, and a vertical column member extending between and connecting the supporting bottom member and the upper member. Each of the supporting bottom member, upper member and vertical column has a curved front portion and a respective flat rear wall in contact with the stator tooth end surface.

The rear walls of the supporting bottom member, upper member and vertical column member are aligned to one another for connection with the respective end of the stator tooth. Each of the curved front portions of the supporting bottom member and the upper member is formed with a respective coolant portal.

In addition, the curved front portion of the vertical column is formed with a plurality of grooves extending in the plane of the tooth axial direction. The grooves formed on the curved front portion of the vertical column extend in fluid communication with the coolant portals formed at the curved front portions of the supporting bottom member and the upper member, respectively.

One of two end-winding organizer members associated with each stator tooth is configured with a sloped jump turn holder assisting in the winding shift from the lower layer to the upper layer which is needed once in each stator tooth winding.

A pump supplies the dielectric coolant fluid that enters the portals of an end-winding organizer member at one of the two ends of each stator tooth where it is directed to enter the stator slots along the two sides of the tooth, causing it to flow along the entire length of both slots through coolant fluid passages before exiting through the portals of the end-winding organizer member at the opposite end of the stator tooth.

In another aspect, the subject matter constitutes a method for thermal management of electric motors. The method comprises the steps of:

winding stator windings around stator teeth,
disposing elongated spacing structures between the winding turns to separate one winding turn from another and define coolant fluid passages which extend continuously along substantially an entire lateral surface of each of the winding turns, and
circulating a dielectric coolant fluid along the coolant fluid passages between winding turns in contiguous contact with the entire lateral surface of the winding turns.

The method assumes the steps of:

forming the elongated spacing structures in a scaffolding configuration or as a monolithic structure having a base frame and a plurality of first and second tabs extending in a spaced apart relationship with one another and in opposite direction from the base frame, where the winding turns are arranged in a first layer and a second layer, and where the winding turns in each of the layers are separated by respective first and second tabs.

The subject method further continues by sandwiching the elongated spacing structure between a surface of the stator tooth and the winding turn to define the coolant fluid passage therebetween.

These and other objects of the present disclosure will become apparent in view of the Patent drawings and the following description of the preferred embodiment(s).

DETAILED DESCRIPTION

Figure 1A:
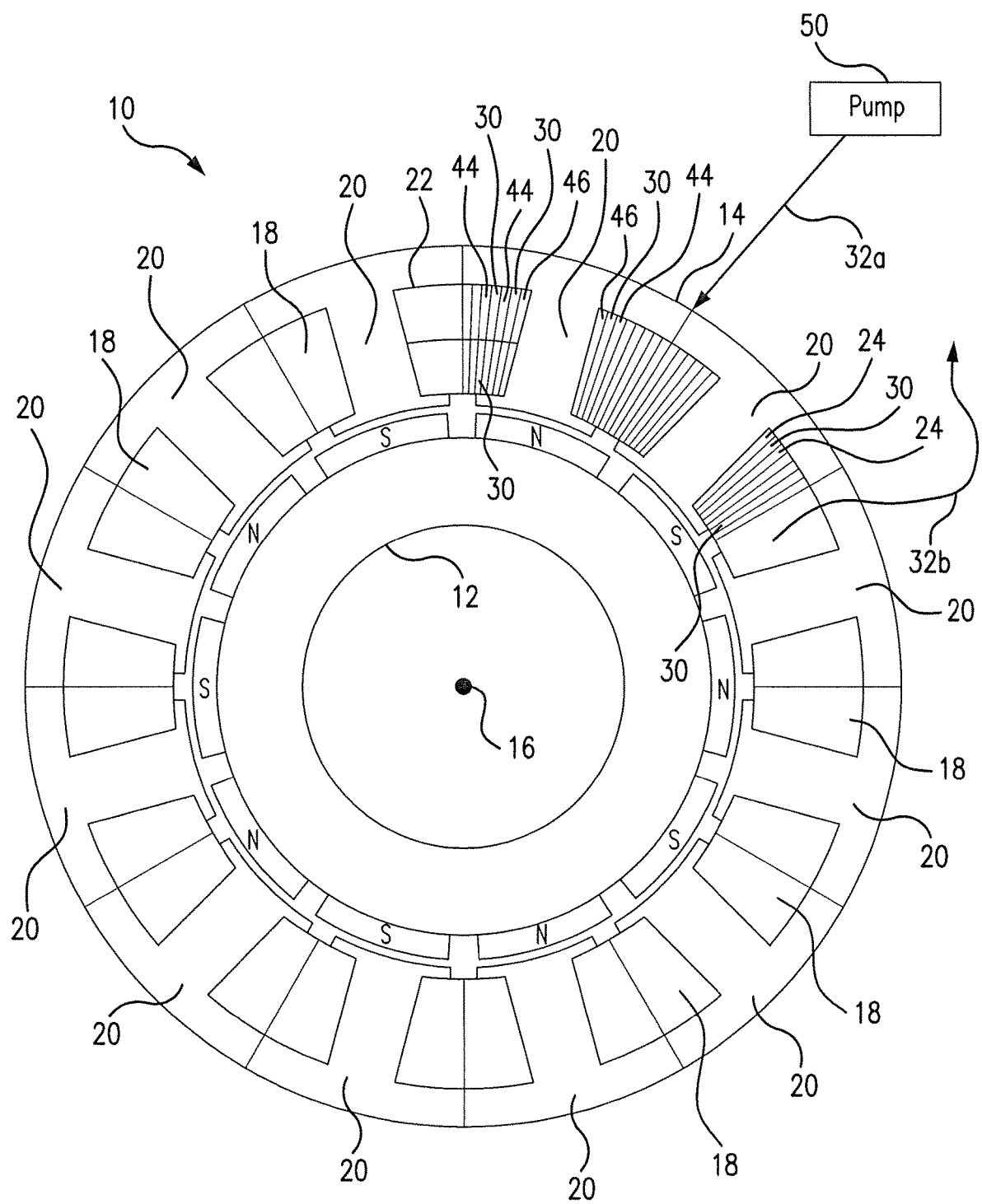
FIG. 1A is a schematic representation of an example of PM (permanent magnet) synchronous machine with 12 segmented stator teeth and 10 poles installed with the subject thermal management system.
Figure 1B:
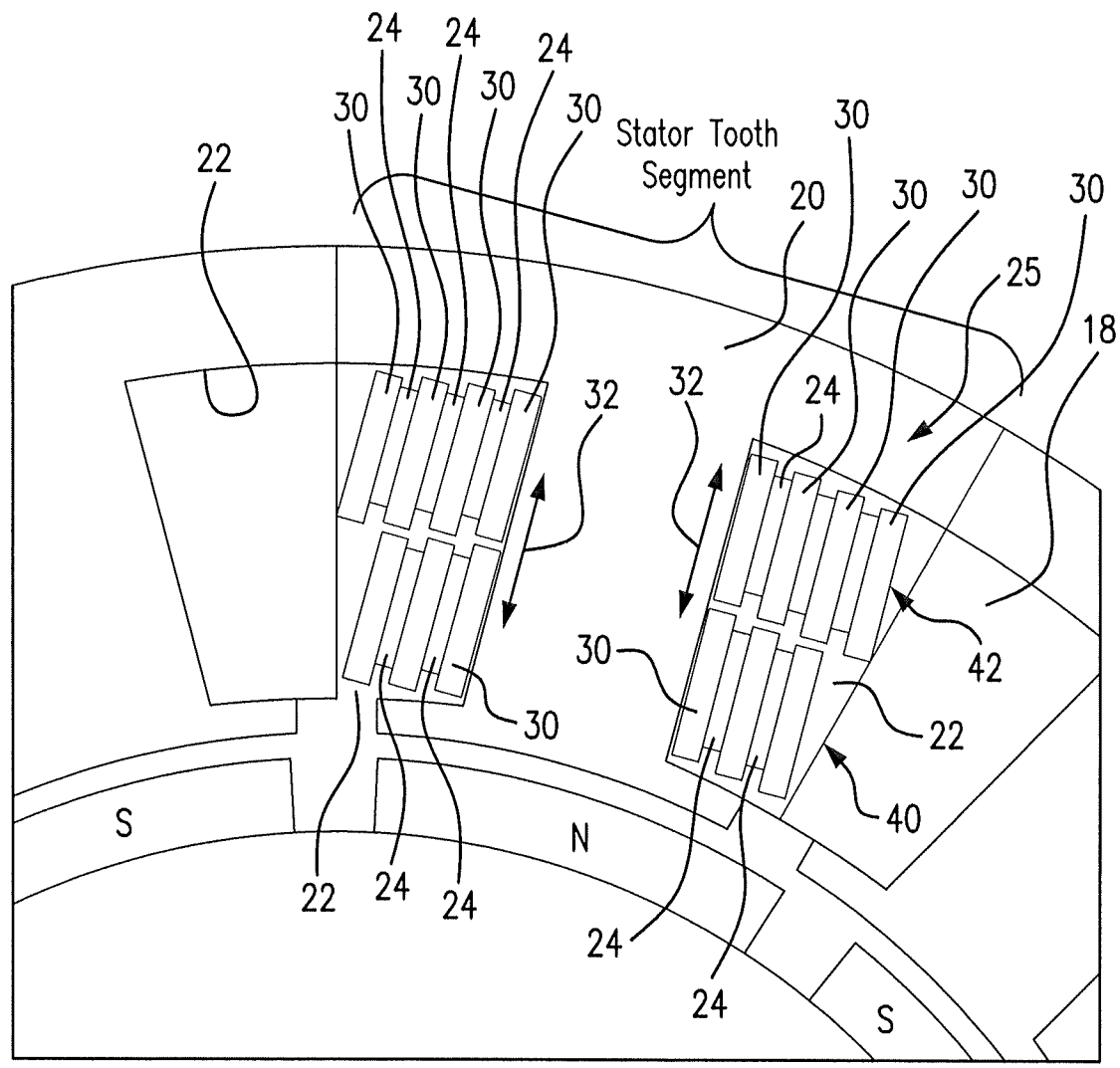
FIG. 1B details a stator tooth segment of the system presented in FIG. 1A.

Referring to FIGS. 1A-1B, an electric motor 10 (PM machine) is shown to include a rotor 12 and a stator 14. The motor structure depicted in FIGS. 1A-1B is just an exemplary structure chosen from numerous configurations of electric motors to which the principles of the subject disclosure are applicable, and other alternative configurations of the stator and rotor, as well as their interrelationships and mutual dispositions, are contemplated in the present system and method.

The rotor 12 is a moving part of the electric motor 10 which turns the shaft 16 to deliver the mechanical power. The stator 14 is the stationary part of the rotary system which provides a magnetic field that drives the rotating armature. The stator 14 in the exemplary embodiment of the electric motor 10 shown in FIGS. 1A-1B is depicted as having twelve segmented stator teeth 20 and ten poles installed with the subject thermal management system 25.

The example electric motor 10 (PM machine) depicted in FIG. 1A includes twelve stator windings 18. Each stator winding 18 is a so-called "concentrated" winding which is wound around a single stator tooth 20. Although twelve stator teeth 20 are shown in association with the stator 14 in FIG. 1A, it is to be understood that an alternative number of stator teeth may be provided depending on the design and application of the electric motor in question. The stator teeth 20 are spaced apart angularly one from another to form stator slots 22 therebetween.

The subject thermal management system 25 is installed in the electric motor 10 to attain a highly effective cooling of the stator windings 18. The thermal management system 25 is configured to form numerous interior fluid pathways inside each stator winding 18 to enable direct contact of the coolant fluid 32 with the highest possible percentage of the heat-dissipating surfaces of each stator winding 18, thereby significantly reducing its temperature, thus overcoming the deficiencies of conventional cooling techniques which treat either the whole stator or all the winding turns around a stator tooth as a monolithic structure and apply cooling only along the outer surface of the stator windings or the outer surface of the entire stator.

The subject thermal management system 25 includes a system of separating (spacing) structures 24 having different configurations. The separating structures 24 may be fabricated, for example, in the form of the scaffolding structure 26 presented in FIGS. 3A-3D, in the format of the monolithic (one-piece) winding structure 28 shown in FIGS. 4A-4B, or any other configuration capable of physical separation of the winding turns 30 from one another to define continuous channels therebetween for circulation of a coolant fluid 32. The scaffolding and monolithic winding structures can be fabricated by a 3D printing process using improved materials with higher thermal conductivity but very low electrical conductivity.

Figure 2:
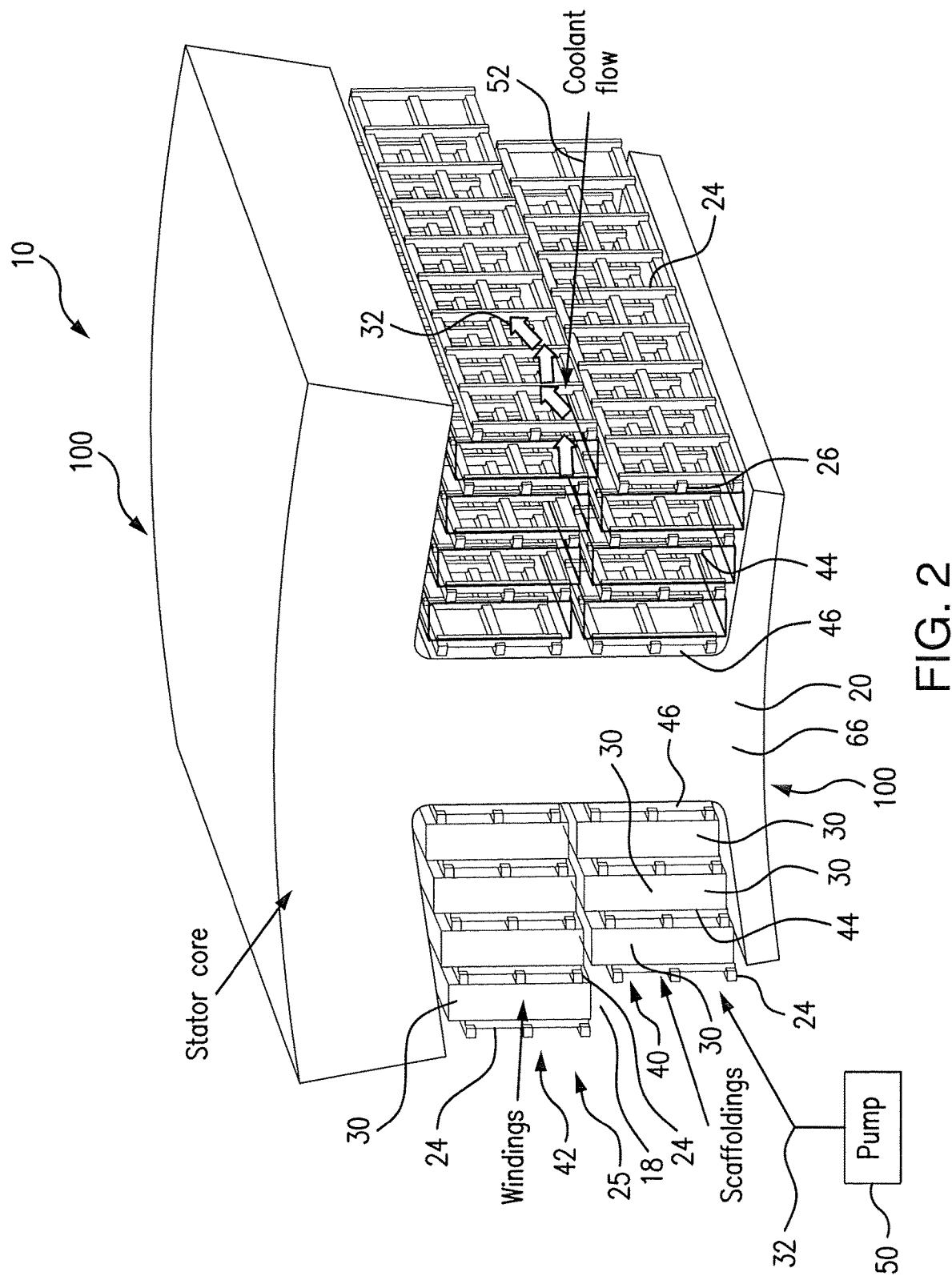
FIG. 2 depicts a cross-section of a stator tooth with a stator winding and scaffolding structures installed between the winding turns.

In the subject in-slot scaffolding cooling, a stator slot 22 is flooded with a dielectric coolant 32. The scaffolding structure is added between the winding turns to create a flow path by creating a thin, lattice-like structure to physically separate each of the winding turns 30, considering the fact that stator windings 18 are tightly packed, as shown in FIG. 2. Since the wires are heavily insulated, or, in the case of the Litz wire, insulated by a layer of insulation around each individual wire strand, the heat conduction across multiple winding turns would be limited. The scaffoldings are placed on one or both sides of each wire turn, so that each individual turn contacts the coolant fluid directly on up to one or both of its lateral sides, thereby minimizing the length of the heat conduction path while maximizing the cooling surface area.

The scaffolding structures 26 may be installed between the winding turns 30, as well as between respective winding turns 30 and a surface of the stator teeth 20, either in the form of a continuous scaffolding structure extended throughout the stator winding 18, or as a series of separate pieces extended throughout the stator winding 18, with the separate pieces linked to one another or not.

As shown in FIGS. 1A-1B, 2, 4B, 5A, 9, 10, and 11, each stator tooth 20 has a corresponding stator winding 18 wound around the stator tooth 20. Each winding 18 forms a number of winding turns 30 and a number of winding layers 40, 42. Although the number of winding turns 30 and the number of the winding layers 40,42 may differ as required by a specific design, as an exemplary embodiment, FIGS. 1B, 2, 4B, 5A, 9, 10 and 11, depict the stator winding 18 wound around the stator tooth 20 using two layers, 40,42, with the upper winding layer 42 formed, for example, with four winding turns 30, and the bottom layer 40 formed, for example, with three winding turns 30. It is to be understood that a different number of layers and a different number of winding turns in each layer may be formed around each stator tooth 20 in the stator 14.

Each winding turn 30 has at least one, but preferably, both lateral winding turn surface(s), installed with a separating structure (also referred to herein as a spacing structure, or a separating member) 24 configured either in the form of the scaffolding structure 26 or the monolithic winding structure 28, or any other form applicable herein. The spacing structures 24 form physical separation between the adjacent winding turns 30 in each winding layer 40 and 42 and define gaps between the adjacent winding turns 30. Each gap constitutes a continuous coolant fluid passage for the coolant fluid circulation between the adjacent winding turns 30. Preferably, the separating structures 24 also are disposed between the winding turns and the tooth body to physically separate them from one another and define the coolant fluid passages between the innermost winding turns and the tooth body.

Thus, the separating structures 24, in the form of the scaffolding structures 26 and/or the monolithic winding structures 28, physically separate adjacent winding turns 30 as well as the winding turns from the tooth body to form corresponding gaps (also referred to therein as coolant fluid passages) therebetween. Each gap (coolant fluid passage) 44 formed between the adjacent winding turns 30, as well as the gap (coolant fluid passage) 46 formed between the winding turn closest to the stator tooth and the stator tooth body (surface), is maintained by the separating structures 24 which can be configured either as the scaffolding structures 26 (shown in FIGS. 2, 3A-3D, 5A, 9, 10), or as the monolithic winding structure 28 (shown in FIGS. 4A-4B and 11), or any other configuration which corresponds to the principles of the subject thermal management system and method.

For example, the scaffolding structures 26 (in any configuration shown in FIGS. 3A-3D) have been developed with the purpose of, when installed inside the stator winding, maintaining the respective coolant fluid passages 44 (between the adjacent winding turns 30), as well as the coolant fluid passages 46 (between the stator tooth 20 surface and the winding turns 30), which define the uninterrupted (continuous) fluid passages for directing a flow of a coolant fluid 32 around and in contact with each individual winding turn 30 in the stator windings 18, and thus provide the fluid flow paths in the stator slots 22 formed between the stator teeth 20. Such arrangement provides an enhanced direct contact area for the coolant fluid 32 with the winding turns 30 with the coolant fluid 32 capable of reaching all sides of the winding turns. The subject structure also minimizes the heat conduction path through the low conductivity insulation layers and maintains a physical separation between adjacent winding turns 30 and the separation between the winding turns 30 and the tooth body that enhances the winding structural integrity and the galvanic isolation between these elements. Since the dielectric fluid 32 is used as a coolant, the dielectric standoff capability is increased between the winding turns 30 so that the insulation layer thickness around the winding strands can be reduced, which is beneficial for the operation of the electric motor installed with the subject thermal management system 25.

Different types of windings and insulation are contemplated for being used in the present structure. Such windings may, for example, include Litz wire which is a particular type of a multistrand wire or cable used in electronics to carry alternating current (AC) at radio frequencies. The Litz wire is designed to reduce the skin effect and proximity effect losses in conductors used at frequencies up to about 1 MHz. It consists of numerous thin wire strands, individually insulated, and twisted or woven together, following one of several carefully prescribed patterns often involving several levels (groups of twisted wires which are twisted together). The result of this winding pattern is to equalize the proportion of the overall length over which each strand is at the outside of the conductor. This approach has the effect of distributing the current equally among the wire strands and reducing the electrical resistance of the Litz wire at high electrical frequencies.

In one example of different varieties of windings and insulations used with the present thermal management system, the coolant fluid 32 may partially flow into the interior of the Litz wire turns, reaching all sides of the Litz wire bundles, or even individual wire strands inside the bundles, thus greatly enhancing the cooling effectiveness of the subject thermal management system.

Shown in FIGS. 1A-1B, 2, 5A, 10, and 11 is a pump 50 which is operated to supply the dielectric coolant fluid 32 into the stator slots 22. The system may use a single or multiple dielectric coolant fluids, which, as an example, may be chosen from the coolants presented in Table 1, or other coolant fluids having a suitable viscosity and dielectric properties.

TABLE 1

| | Viscosity @ 40° C. (cst) | Breakdown Voltage (kV) |
|---|---|---|
| ATF (auto transmission fluid) | 35.6 | 35 |
| PAO (Polyalphaolefins) | 17.2 | 41 |

The dielectric coolant fluid 32 circulates within the stator slots 22 through the gaps 44 and 46 formed inside the stator windings 18 by the separating structure 24 (either in the configuration of the scaffolding structures 26, or winding structure 28, or any other configuration capable of providing a stable physical separation between the winding turns and defining the uninterrupted fluid passages for the coolant fluid circulation) installed within the stator windings 18. The separating structures 24, in the form of the scaffolding structures 26 and/or monolithic winding structures 28, provide structural integrity to the stator windings 18 and maintain physical separation between the winding turns 30 and the stator tooth surface, for the dielectric coolant fluid 32 to circulate through all coolant fluid passages 44 and 46 along all stator slots 22 in the stator 14. As presented in FIG. 1A, the coolant fluid 32a enters into the stator slot 22 directed by the pump 50, circulates through the coolant fluid passages 44, 46 defined within the stator windings 18, passes along and through the stator slots 22 between the stator teeth 20, and exits (coolant 32b) the electric motor through the same slot. The coolant fluid 32b exiting from the electric motor may be further cooled and returned into the thermal management system 25 for further circulation within the stator windings 18 as long as needed for the operation of the electric motor 10.

Figure 3A:
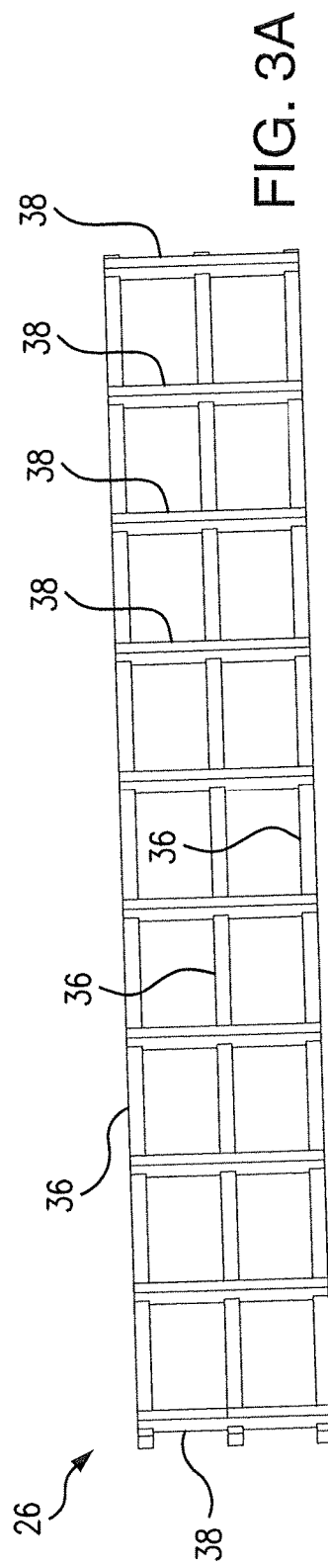
FIGS. 3A-3D depict alternative exemplary varieties of the subject scaffolding structures.
Figure 3B:
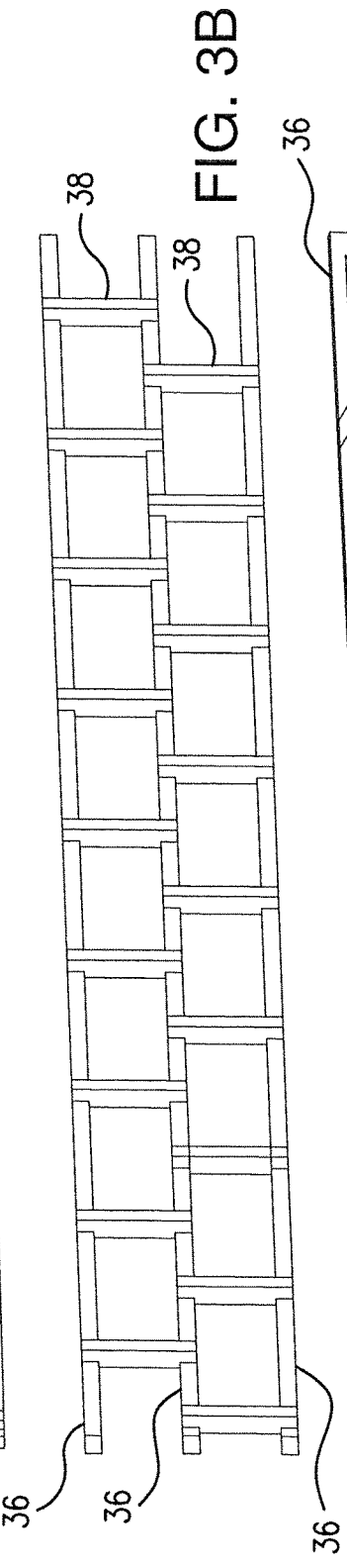
Figure 3C:
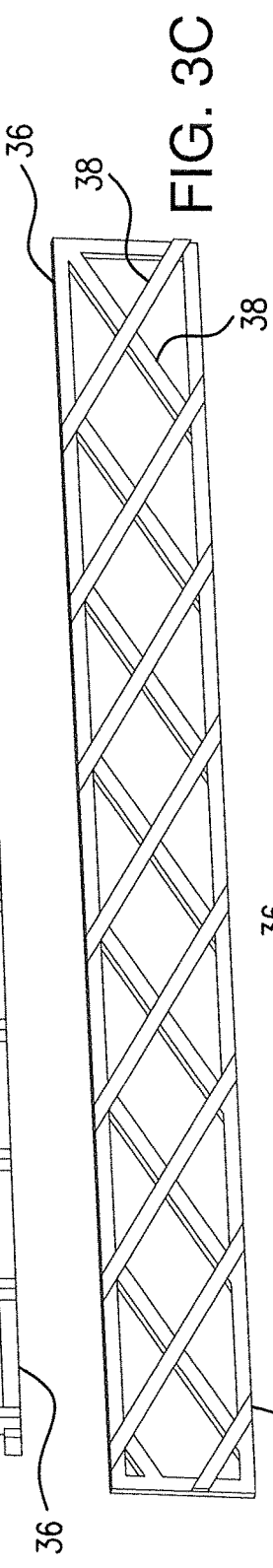
Figure 3D:
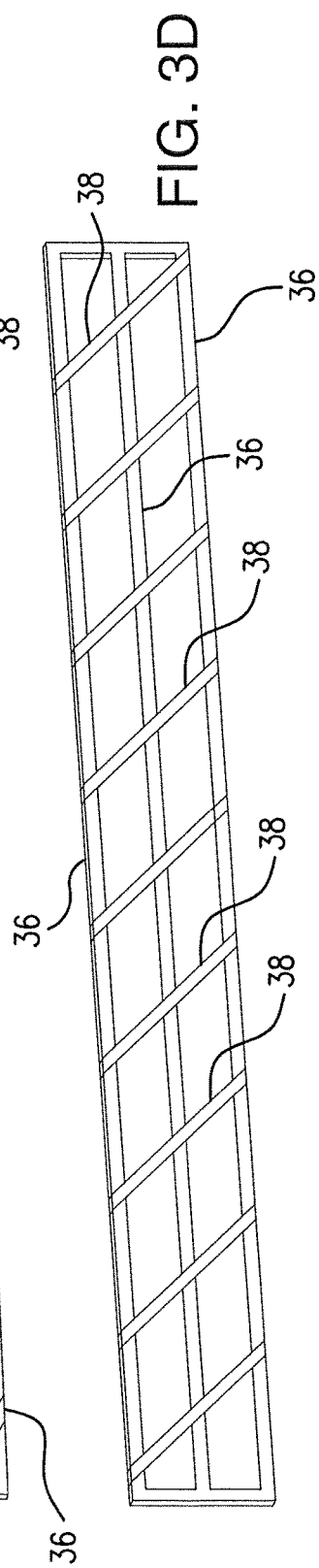

Shown in FIG. 2 is a coolant flow 52 through the scaffolding structures 26 installed in each stator winding 18. Each scaffolding structure 26 includes longitudinal (horizontal) bars 36 and crossing bars 38. The crossing bars 36 extend in a crossing relationship with the longitudinal bars 35 at various angles, including a right angle as shown in FIGS. 3A-3B, and with different positional patterns, as shown in FIGS. 3A-3D, or any other configuration of the scaffolding structure 26 which can provide an arrangement devoid of a blockage in the passage for the coolant flow 52. The variety of candidate scaffolding structures shown in FIGS. 3A-3B are examples only and not intended to represent an exhaustive set of scaffolding geometries.

The longitudinal bars 36 and crossing bars 38 are positioned in two different planes, so that the coolant fluid filling the volume of the scaffolding structure 26, may flow freely without interruptions through and along the scaffolding structures 26 between the winding turns 30 and between the winding turns and the stator tooth surface.

Figure 4A:
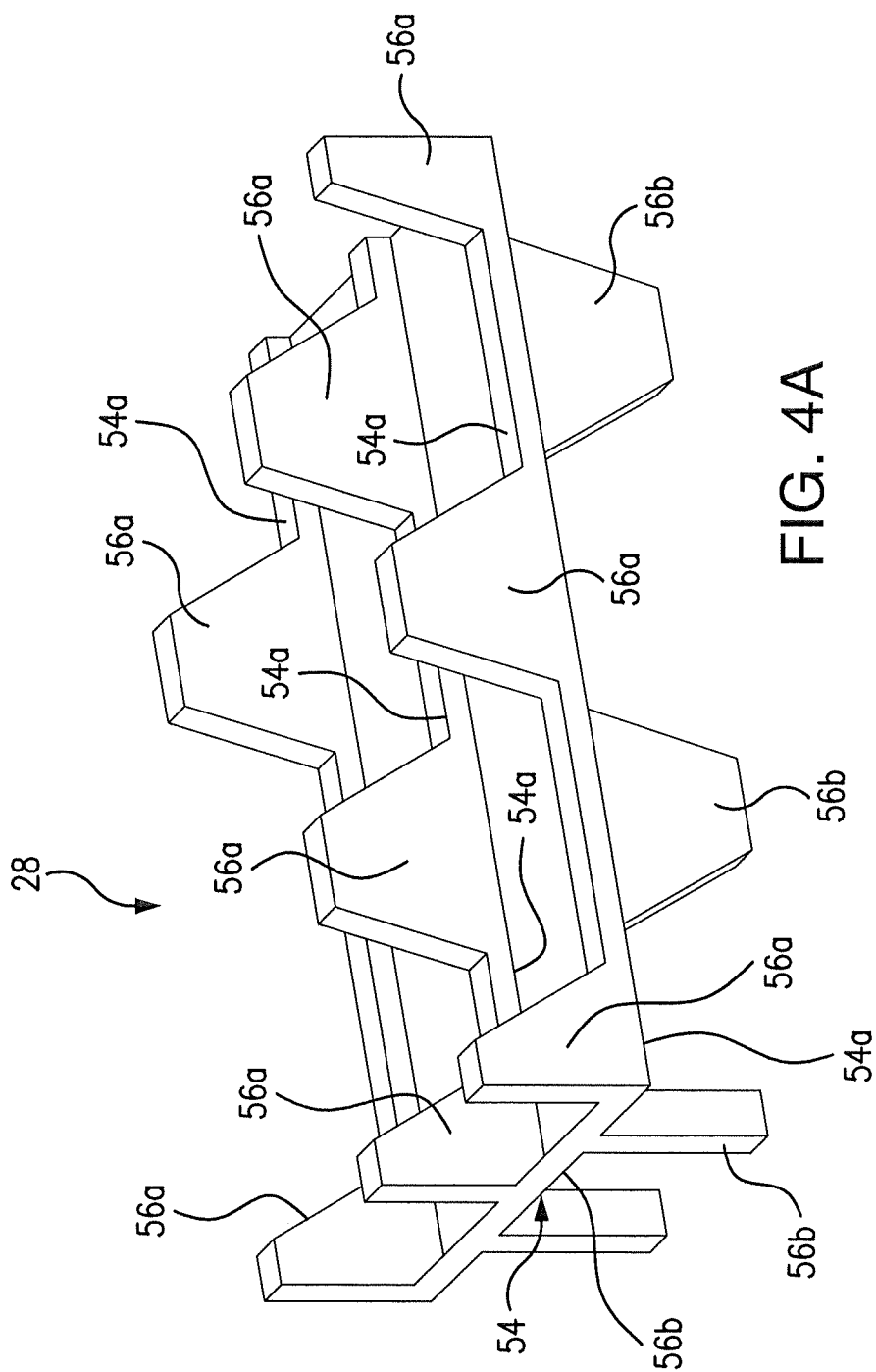
FIGS. 4A-4B depict an alternative configuration of the spacing structure utilized in the subject thermal management system with FIG. 4A showing the monolithic (one-piece) spacing structure to provide a physical separation and continuous fluid path between winding turns, and FIG. 4B showing the monolithic spacing structure of FIG. 4A installed with the stator winding.
Figure 4B:
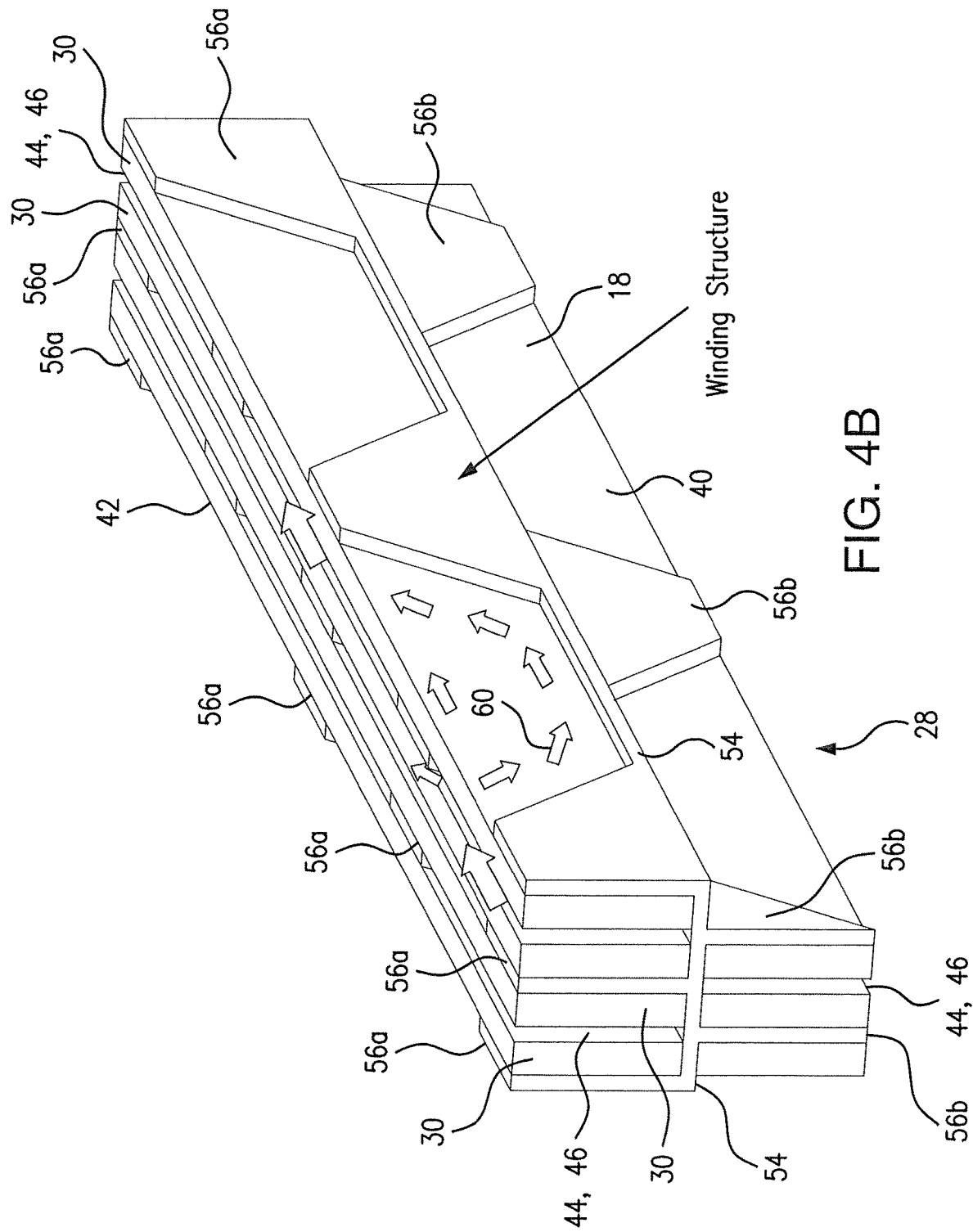

Referring now to FIGS. 4A-4B, an alternative embodiment of the separating structure 24 may be configured as a monolithic winding structure 28, which constitutes an integral configuration formed with a horizontal frame 54 which is positioned between and defines the layers 40 and 42 of the winding turns.

The winding structure 28 is a one-piece winding structure utilized to provide the physical separation and continuous coolant fluid path. The winding structure 28 enables an easy manipulation, placement, and retainment of the windings during assembly. Although shown in FIGS. 4A-4B with four winding turns 30 in the upper tier (layer 42) and three winding turns 30 in the lower tier (layer 40), it is to be understood that any other number of the winding turns in each layer is contemplated in the subject system.

The horizontal frame 54 in the monolithic winding structure 28 may be formed with parallel beams 54a extending longitudinally along the frame 54 and forming supporting elements for vertical members integrally connected with the parallel beams 54a of the horizontal frame 54. Although the horizontal frame 54 is shown with three parallel beams 54a it is to be understood that any number of the parallel beams 54a is contemplated for the design of the monolithic winding structure 28, depending on the number of the winding turns desired in the winding 18.

The vertical members are represented by upper vertical members 56a and lower vertical members 56b which extend from the horizontal frame 54 in opposite directions and in an alternative fashion.

When the monolithic winding structure 28 is installed with the stator winding 18, as shown in FIG. 4B, the winding turns 30 in one tier of the monolithic winding structure 28, for example, in the upper layer 42, extend above the horizontal frame 54 with the vertical member 56a separating one from another. Similarly, the winding turns 30 in another tier of the monolithic winding structure 28, for example, in the lower layer 40, extend below the horizontal frame 54. The winding turns 30 in the lower layer 40 are separated one from another by the bottom vertical members 56b, as shown in FIGS. 4A-4B. The monolithic winding structure 28 thus provides physical separation between each winding turn 30 in each winding layer 40 and 42, and forms coolant fluid passages 44 therebetween and the coolant fluid passages 46 between the winding turns and the stator tooth body (surface) through which the dielectric coolant fluid 32 circulates, as shown by the coolant flow 60 in FIG. 4B.

When the stator slots 22 are flooded with the dielectric coolant fluid 32, being directed in by the pump 50, the dielectric coolant fluid 32 circulates through the gaps 44 and 46 formed between the adjacent winding turns 30 and between the winding turns and the tooth body surface, respectively. The circulation of the dielectric coolant fluid 32 in contiguous contact with each winding turn 30 along its entire length, as well as between the stator tooth surface and the winding turns, provides highly efficient cooling.

To further improve the effectiveness of the subject technique, the material used for the scaffolding structure 26 and winding structure 28, may be selected to have a high thermal conductivity to enhance its ability to conduct heat away from the stator windings 18. This approach effectively reduces the thermal resistance encountered by heat flowing from the winding turns to the coolant by making it easier for the heat to flow from the winding turns into the scaffolding material which then can serve the same role as the heat fins in conventional fluid convection cooling systems.

The scaffolding and the winding structures 26 and 28 may be fabricated by a 3D printer using the improved materials with a high thermal conductivity.

As an example, the materials presented in Table 2 are considered suitable for fabrication of the scaffolding structures and monolithic winding structures.

TABLE 2

|  | Max temperature (° C.) | Dielectric strength (kV/mm) |
| --- | --- | --- |
| Nylon 12 HST | 194 | 18.5 |
| ULTEM 1010 | 216 | 9.4 |
| PTFE | 260 | 19.7 |

To implement the scaffolding structure in the end-winding of the stator, the winding turns need to be organized and carefully positioned. An end-winding organizer has been designed for this purpose. It is especially beneficial for Litz wire. However, the end-winding organizer is applicable in other types of wire used in winding turns as well.

Figures 5A, 5B:
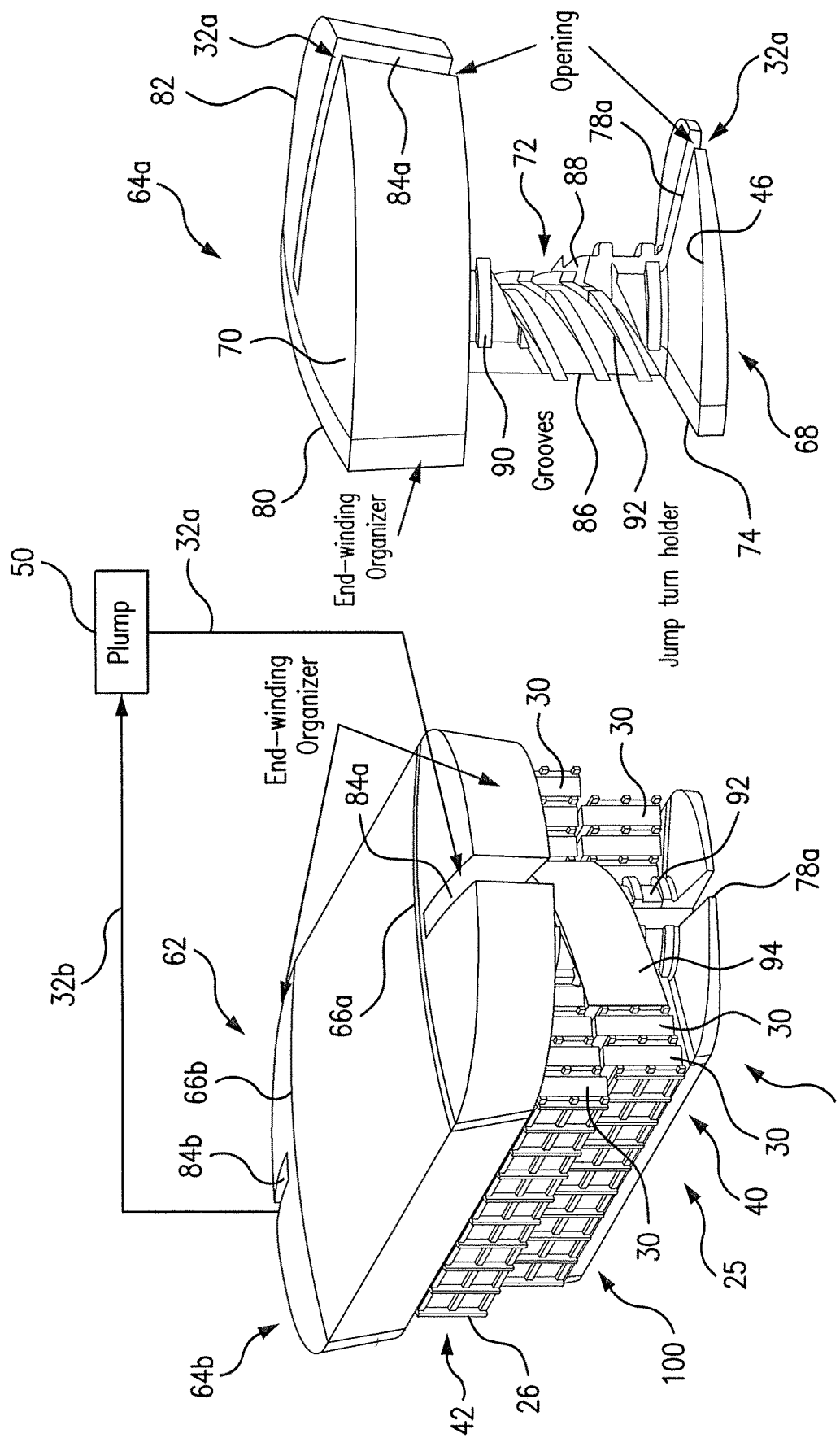
FIGS. 5A-5B depict the end-winding organizer utilized in the subject system with FIG. 5A showing the end winding organizer members positioned at the two ends of the stator tooth, and FIG. 5B showing the end winding organizer member.

Referring to FIGS. 5A-5B, an end-winding organizer assembly 62 is provided in the subject system (which includes two end-winding organizer members 64a, 64b) to enhance the fabrication process for high-quality winding configurations. The end-winding organizer assembly 62 provides a convenient curved surface against which the winding turns can be held in tension during their 180-degree mechanical bends in the end winding regions 66a, 66b at both ends of each stator tooth 20 before re-entering the adjacent slot.

One of the two end-winding organizer members 64a, 64b associated with each stator tooth 20 can include sloped mechanical guides 92 serving as a jump turn holder for the jump turn 94, which is the winding turn that connects two adjacent layers 40 and 42 of the winding turns (as shown in FIGS. 5A-5B). Only one of the two end-winding organizer members 64a, 64b associated with each stator tooth 20 requires mechanical guides 92 because the stator winding needs to shift from the lower layer 40 to the upper layer 42 only once in each stator winding 18. The second end-winding organizer member associated with the stator tooth 20 does not need the mechanical guides 92 (jump turn holder), but only needs the grooves 90 that extend in the plane of the tooth axial direction.

The system of grooves 90 are formed on the surface of the end-winding organizer member 64a, 64b which are intended to serve the same function as the inter-turn scaffolding to ensure that the flowing coolant reaches the surface of the innermost turns that contact the end-winding organizer surface. Each end-winding organizer member 64a, 64b also provides two portals 78a, 84a and 78b, 84b, respectively, for the coolant fluid 32a flowing into and fluid 32b flowing out of the winding structure at the two ends of the stator slot 22 to ensure that the coolant reaches all the winding turns in both their in-slot region 100 and end-winding regions 66a, 66b, respectively.

As shown in FIGS. 5A-5B, one of two end-winding organizer members, for example, the end-winding organizer 64a has the slot 84a in its upper surface and the slot 78a in its lower surface to allow the coolant fluid 32a to have an easy path to enter both layers 42 and 40, respectively, of the stator winding 18 at the end region area 66a. These two slots 84a, 78a serve as the entry portals for the end-winding organizer member 64a at one end 66a of the stator tooth 20. The slot 84b (shown in FIG. 5A) and the slot 78b (best shown in FIGS. 10-11) are formed in another end-winding organizer member 64b positioned at the opposite end region 66b of the stator tooth 20 to serve as the exit portals for the coolant fluid 32b to exit the respective stator slot 22.

Specifically, the end-winding organizer assembly 62 includes two end-winding organizer members 64a and 64b positioned at two end winding regions 66a, 66b, respectively, at both ends of the stator tooth 20, to facilitate the winding turn pattern and to mechanically guide jump turns from one layer 40 to another layer 42 in the winding 18.

Each end-winding organizer member 64a, 64b includes a bottom supporting structure 68, an upper structure 70 and a vertical column 70 which extends between the bottom supporting structure 68 and the upper structure 70 and supports both the upper structure 70 and the bottom structure 68 in the horizontal and axial orientation.

The bottom supporting structure 68 defines the base of the end winding organizer member 64a, 64b. The bottom supporting structure 68 has a rear wall 74 and a curved front portion 76 which extends from the rear wall 74 and supports the lower layer 40 of the stator winding 18, as well as prevents it from moving upward or downward (radially) in response to electromagnetic forces that the end winding may experience. The front portion 76 of the bottom supporting structure 68 has an opening 78a or 78b formed therein that serves as an entry or exit portal for the coolant fluid, depending on which end 66a or 66b of the stator tooth the end-winding organizer member (64a or 64b) is mounted.

The upper structure 70 has a rear wall 80, a curved front portion 82 which has a slot 84a or 84b formed therein that also serves as either an entry or exit portal for the coolant fluid depending on which end 66a or 66b of the stator tooth 20 the end-winding organizer member (64a or 64b) is mounted. The upper structure 70 serves to support the upper layer 42 of the winding 18 in the presence of electromagnetic forces that the end winding may experience.

The vertical column 72 has a rear wall 86 and a curved front portion 88 which is configured with a system of grooves 90. The system of grooves 90 support the function of the end winding organizer structures 64a, 64b to serve as a scaffolding structure that allows the coolant fluid to flow through the grooves 90 and along the inside surfaces of the winding turns 30 that are in direct contact with the end winding organizer members 64a, 64b in the end winding regions 66a, 66b, respectively, of the stator tooth 20.

The mechanical guides 92 (jump turn holder) are formed between the upper layer 42 and the lower layer 40 on one of the end-winding organizer members 64a or 64b associated with each stator tooth 20. The mechanical guides 92 facilitate the transition of the jump turn 94 wire from one layer (for example, 40) to another layer (for example, 42) during the winding of the wires, as shown in FIGS. 5A-5B.

The rear walls 74, 80, and 86 of the bottom supporting structure 68, upper structure 70, and the vertical column 72, respectively, are aligned one with another and are shaped to match the cross-sectional outline of the stator tooth at the ends 66a, 66b of the stator tooth 20 so that the innermost stator tooth winding turns on both winding layers together with their separators will maintain close contact with each stator tooth surface and organizer surface as they emerge from the tooth slot into the end winding regions 66a, 66b on both sides of the stator tooth 20.

The end winding organizer assembly 62 enhances the effectiveness of the cooling of the stator as it provides slots 78a, 78b and 84a, 84b which are formed to be in fluid connection with the system of the coolant fluid passages inside the stator windings and with the grooves 90, and thus serve as the portals for the coolant fluid 32a to enter into the end winding region 66a of the winding at one end (for example, through the slots 74a, 84a) before flowing down the length of the stator slot and subsequently exiting (32b) the winding through the slots 78b, 84b mounted at the opposite end 66b of the stator tooth 20, as schematically presented in FIGS. 5A-5B.

A CFD (Computational Fluid Dynamic) simulation of the scaffolding-based in-slot cooling using the subject thermal management system for the Litz wire based stator wiring has been carried out and delivered promising results. Assuming 21 W/cm$^3$ heat loss in the Litz wire with 8.7 mm×2.3 mm cross section, seven winding turns around each stator tooth, and eighteen stator teeth in total, the stator can be easily cooled below the 180° C. maximum temperature limit with 55° C. Polyalphaolefin (PAO) coolant fluid.

Figure 6:
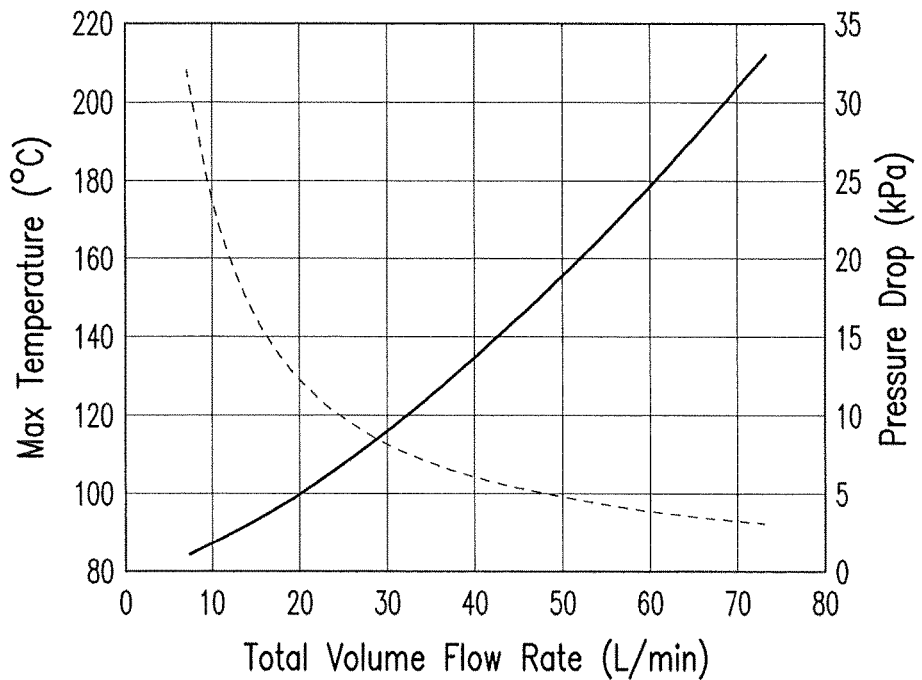
FIG. 6 is a diagram representative of the thermal performance of the subject thermal management system utilizing the scaffolding structure of FIGS. 3A-3D for in-slot cooling of electric motors showing the maximum winding temperature and the pressure drop between the two ends of the stator teeth vs. the total coolant volume flow rate for the complete stator at 20 kW heat load.

The calculated relationship between the flow rate, pressure drop, and maximum hot-spot temperature of the scaffolding structure anywhere inside the stator slot or end windings is shown in FIG. 6. The total volume flow rates presented are for an electric motor that includes 18 stator teeth and 18 stator slots, with each stator slot equipped with the subject in-slot cooling technology. The predicted pressure drop along the length of the stator slots as a function of the total coolant flow in the stator is appealingly low. The maximum winding temperature drops rapidly to conservatively low levels as the flow rate is increased to moderate levels.

Figure 7:
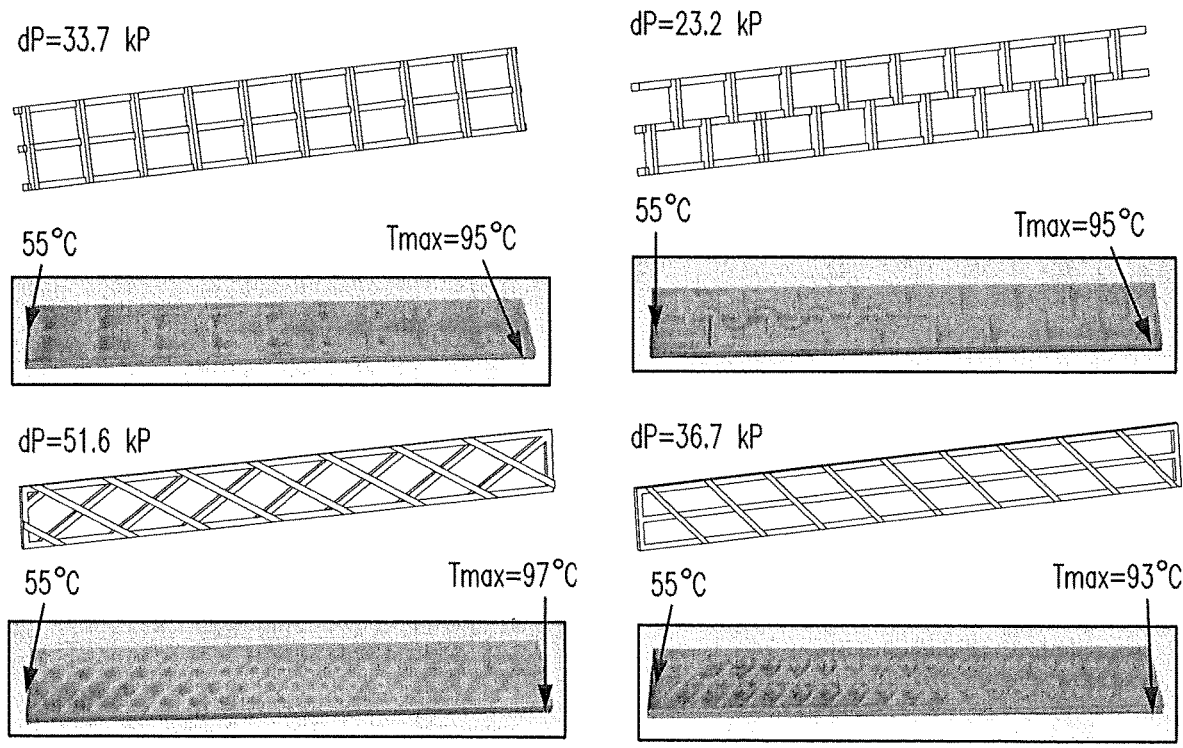
FIG. 7 is representative of the CFD-predicted thermal performance of the subject thermal management system utilized with alternative scaffolding structures shown in FIGS. 3A-3D with 60 L/min coolant flow rate for the thermal operating conditions used for the diagram shown in FIG. 6.

All four of the scaffolding structures geometries shown in FIGS. 3A-3D are calculated to achieve similarly attractive predicted thermal performance shown by the pressure drop and maximum temperature values in FIG. 7 for the same operating conditions as in FIG. 6.

Figure 8:
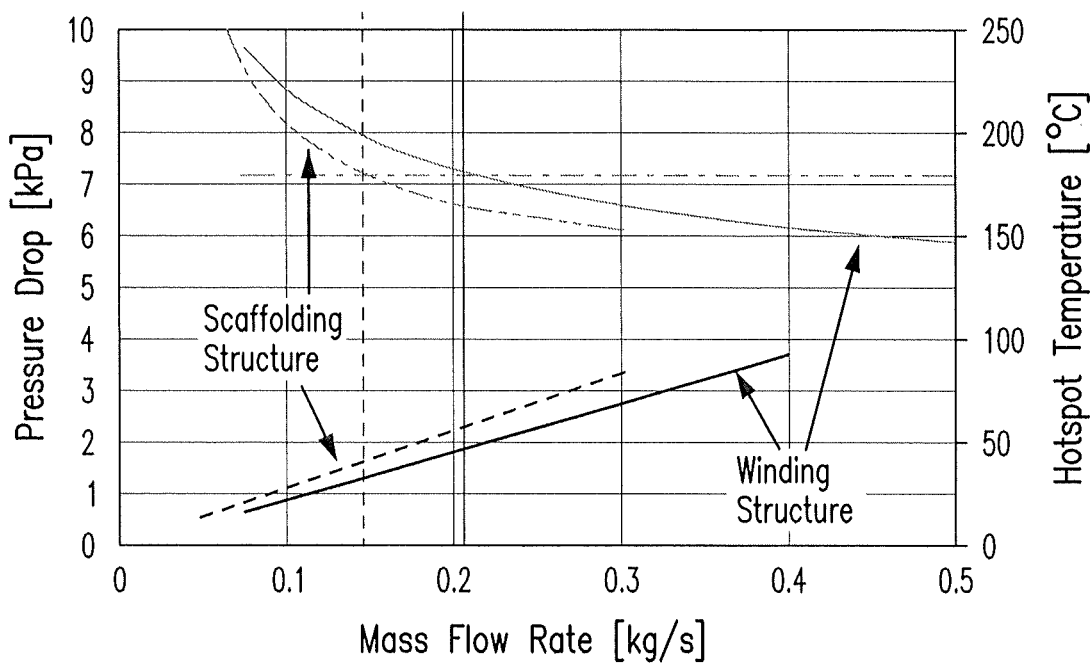
FIG. 8 is a diagram representative of the CFD-predicted thermal performance of the subject thermal management system utilizing the complete 7-turn monolithic spacing structure showing the predicted maximum hot-spot temperature in the monolithic spacing structure and the calculated pressure drop along the length of the monolithic spacing structure compared to the same operational conditions for the subject thermal management system utilizing the scaffolding structure.

For the example stator winding coil with seven winding turns arranged in two layers as shown in FIGS. 1B, 2, 4B, 5A, 9, 10, and 11, the predicted thermal performance of the monolithic winding structure as reflected in the predicted maximum hot-spot temperature and the calculated pressure drop along the length of its seven turns is comparable to that of the scaffoldings, as shown in FIG. 8.

Figure 9:
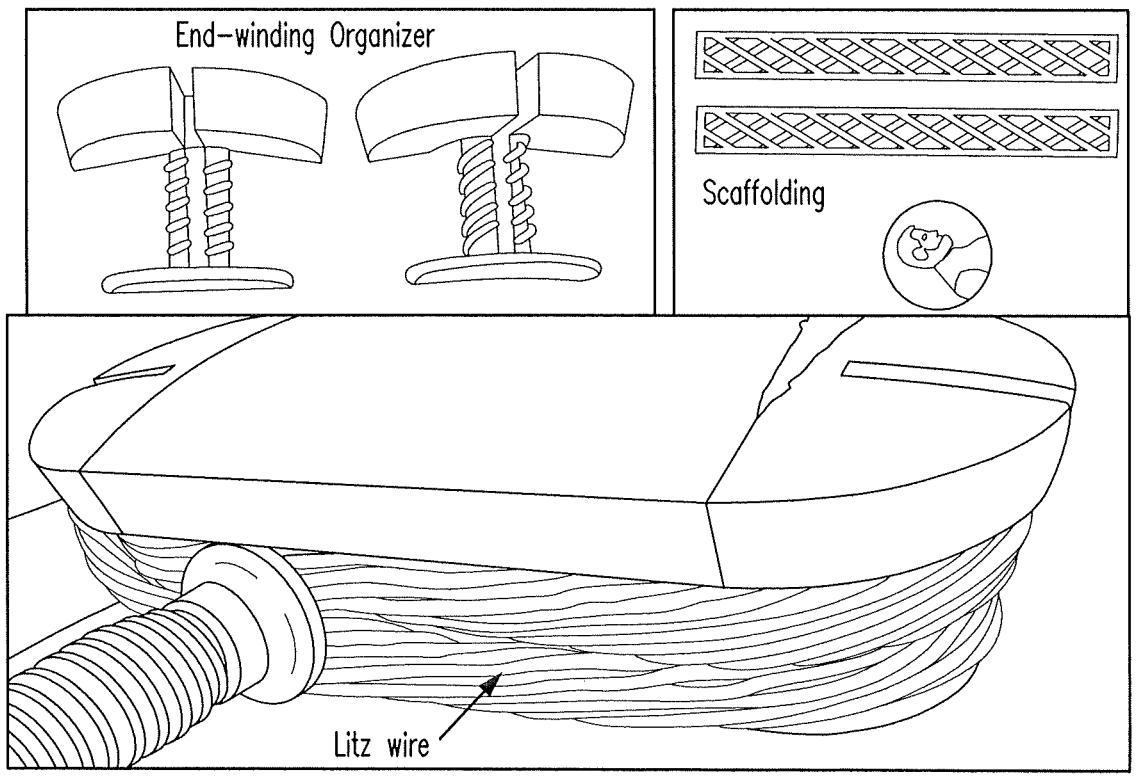
FIG. 9 depicts an example prototype version of the stator tooth with 7-turn Litz-wire winding and the inter-turn scaffolding and end-winding organizer members.

A prototype of the subject thermal management system shown in FIG. 9 has been built and tested. The scaffolding structures, end-winding organizer members, and one stator tooth for the prototype have been 3D printed, and the Litz wire was used to carry high current to generate the expected heat load in the machine.

Figure 10:
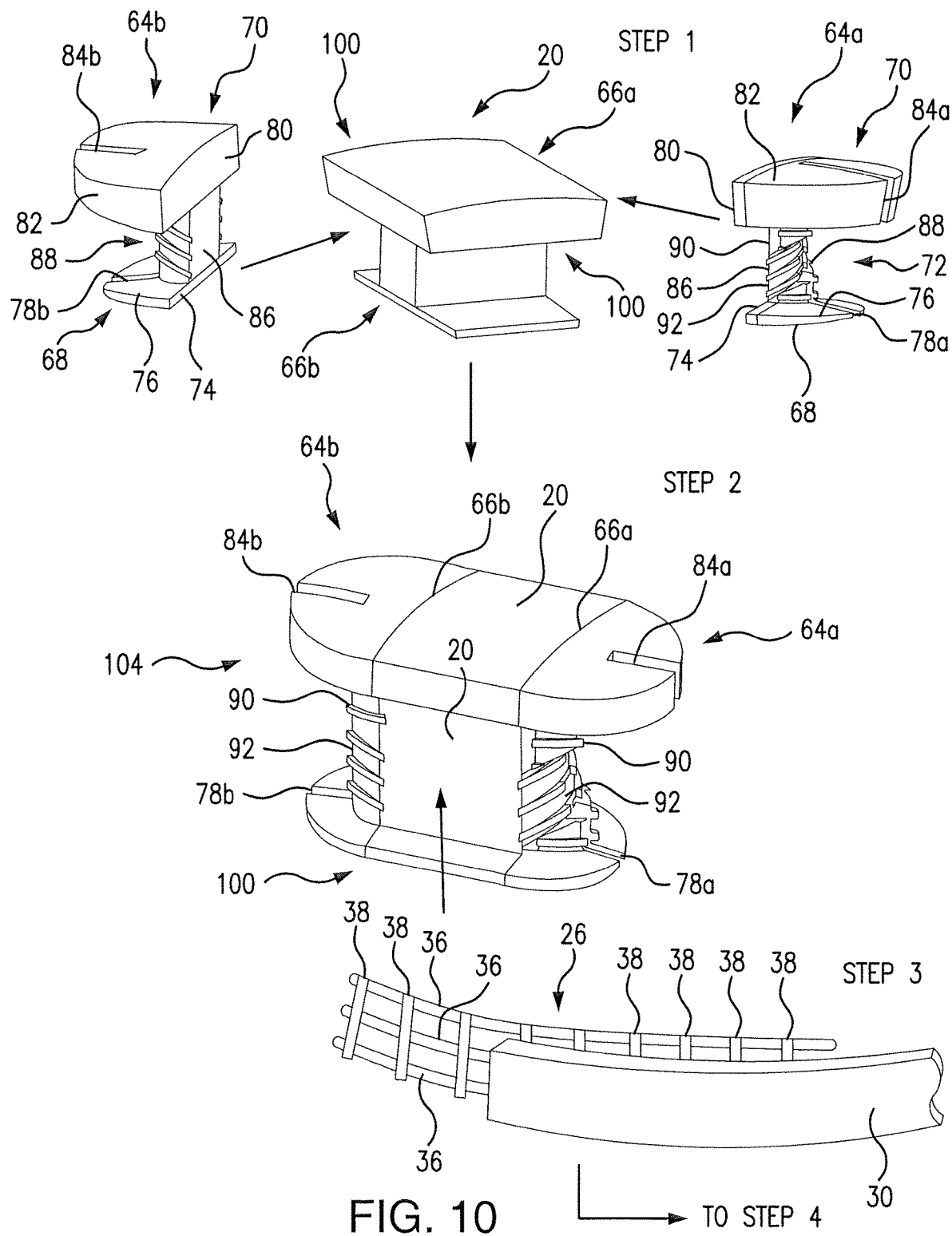
FIG. 10 is representative of an example fabrication process for installation of a stator winding for an electric motor with the subject thermal management system utilizing the scaffolding configuration.
Figure 10:
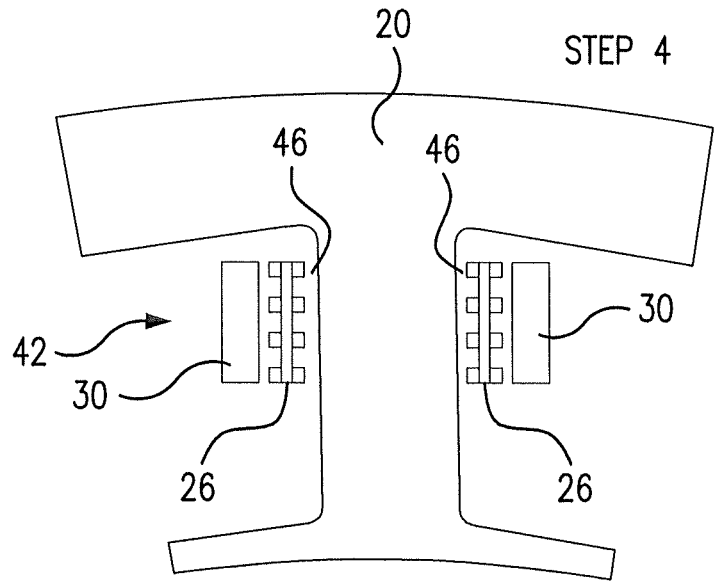
Figure 10:
Figure 10:
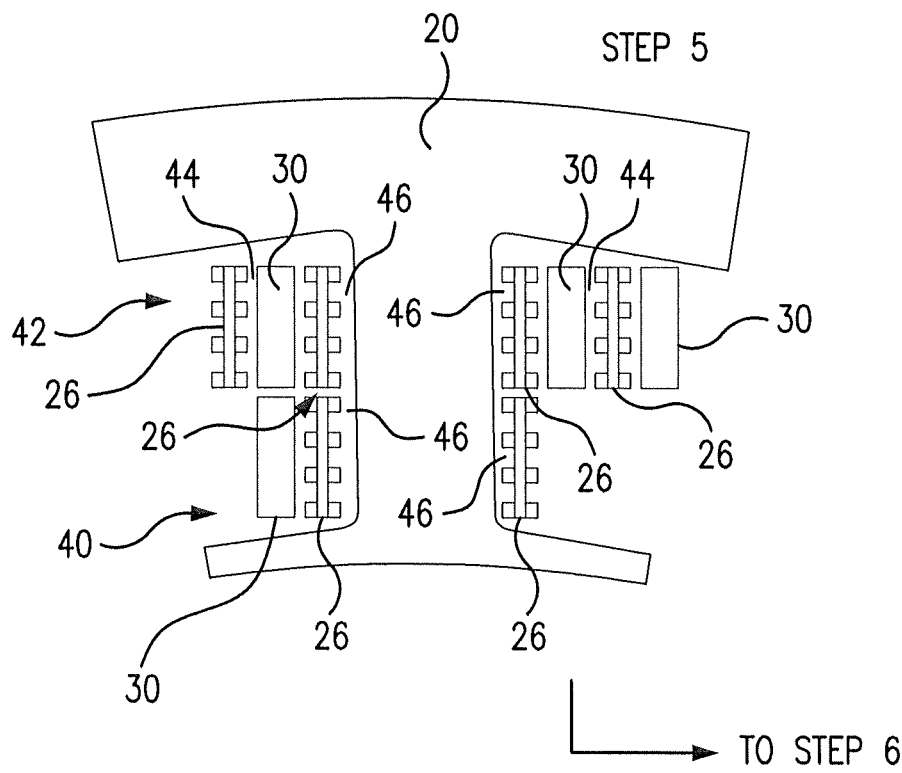
Figure 10:
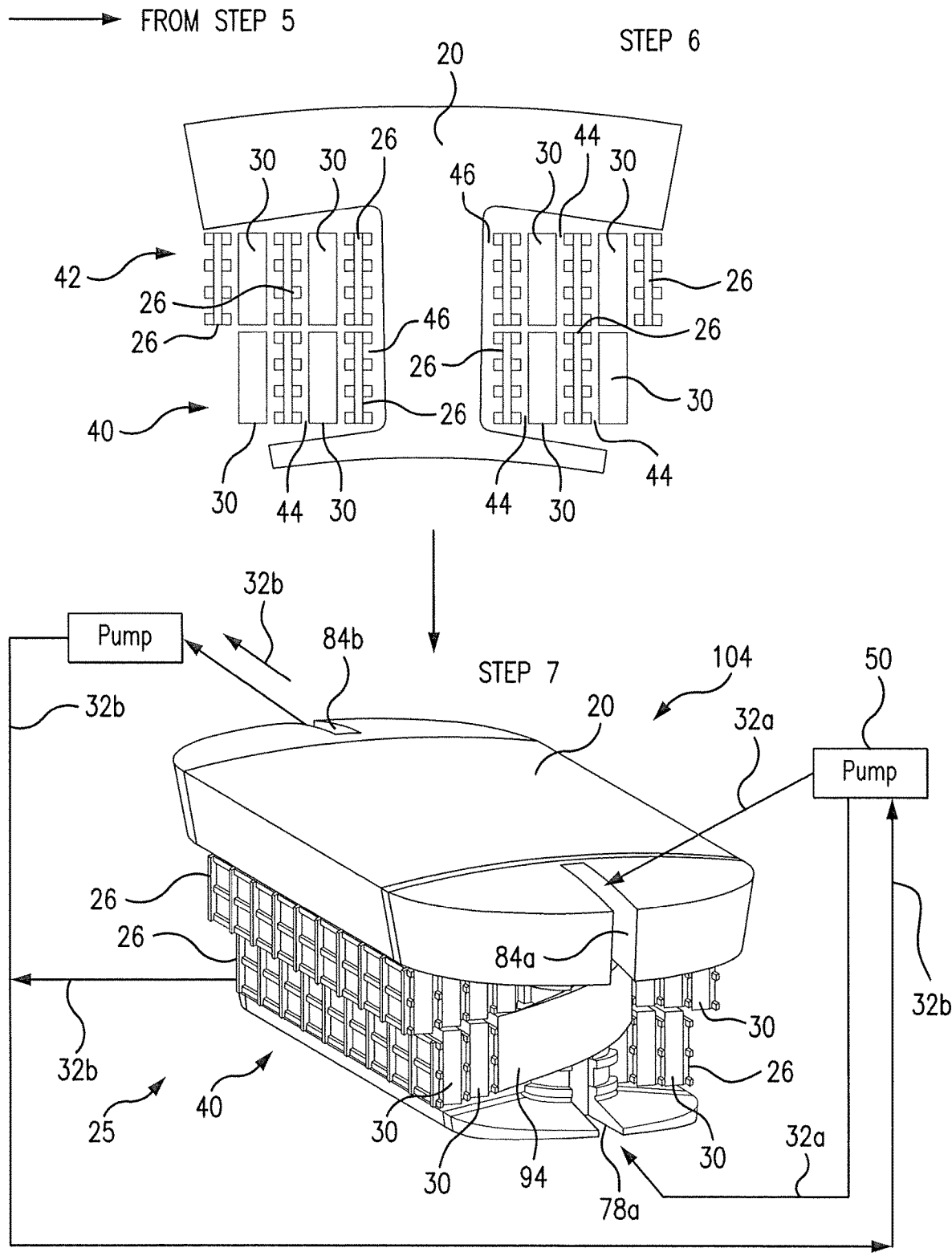

Referring to FIG. 10, which represents an exemplary process for assembling the subject system using the scaffolding structure 26, the method begins with Step 1 wherein the stator teeth 20 and two end-winding organizer members 64a, 64b are provided.

Subsequently, in Step 2, the stator tooth and end-winding organizer assembly 104 is formed by assembling each stator tooth 20 with two end organizers members 64a, 64b. The two end-winding organizer members 64a, 64b are attached to the end winding regions 66a, 66b, respectively, of the stator tooth 20 to form the combined stator tooth and end-winding organizer assembly 104.

In the subsequent Step 3, the winding wire is brought in contact with the scaffolding structure 26 to form a two-layered assembly.

In Step 4, the two-layered assembly of the scaffolding structure 26 and the winding wire is wound around the stator tooth and end winding organizer assembly 104 with the scaffolding structure 26 in contact with the tooth surface and the winding turn 30 spaced from the stator tooth surface by the scaffolding structure 26, to form a first winding turn 30 in the layer 42. The first winding turn 30 is separated from the stator tooth surface by the gap 46 which defines the coolant fluid passage 46 between the winding turn and the stator tooth surface. The configuration of the winding/scaffolding structure formed and shown in Step 4 is for ease of understanding of the fabrication process.

However, it may be preferred to form the winding in accordance with a specific fabrication strategy underlying the initiation of the winding operation near the middle of the stator winding length, with one half of it being wound to form the upper layer, while the other half of the winding length used to form the lower layer. Otherwise, if trying to form the two layered winding in Step 4, beginning with one end of the winding wire, the upper layer would be formed, and the wire would subsequently have to be squeezed between the upper and lower layers to return to the stator tooth surface on the lower layer to start winding at the lower layer. The wire being squeezed between the upper and lower layers disrupts the winding and is a serious problem because there is no space allocated for it in the stator slot area.

Thus, the first turn in the upper layer 42 that appears in Step 4 is positioned near the center of the Litz wire length that comprises both layers 40,42 of the stator winding. Starting from this first turn, approximately one half of the wire length is used to form the upper layer of the stator winding and approximately half the other half of the stator winding length is used to form the lower winding layer after transitioning from the upper layer 42 to the lower layer 40 using the jump turn mechanical guides 92 provided by one of the two end-winding organizer members 64a, 64b.

As shown in the subsequent Step 5, the process is continued by applying a second turn of the upper layer 42 winding consisting of the scaffolding structure 26 and the winding wire in the same layer 42 (thus forming the coolant fluid passage 44 between the adjacent winding turns 30). Step 5 also shows the application of the first turn of the lower layer 40 after the wire for the other half of the stator winding passes through the mechanical guides 92 in one of the end-winding organizer members 64a or 64b. The same two-layered assembly of the scaffolding structure 26 and the winding turn 30 shown in Step 3 is used during the formation of the lower layer 40.

The process of Step 5 further continues for adding turns till a required number of turns is attained as, for example, presented in Step 6, i.e., until all winding turns 30 with the intermediately positioned scaffolding structures 26 are wound around the assembly 104.

Steps 3-6 show the operation of repeated winding of the scaffolding structures 26 with the winding turns 30 around the stator tooth and end-winding organizer assembly 104. The resulting structure of the present thermal management system 25 is shown in Step 7.

Although Steps 6 and 7 show the assembly 104 with two layers 40 and 42 of the windings turns 30 positioned intermittently with the scaffolding structures 26, where the layer 40 has four winding turns 30, while the layer 42 has three winding turns 30 intermittent with the scaffolding structure 26 between each of those winding turns 30, it is to be understood that a different number of winding turns 30 in each layer, and a different number of layers is also contemplated in the subject thermal management system.

During the winding of the stator winding 18 around the stator tooth 20, the scaffolding structure 26 between the winding turns 30 can be incorporated in the stator winding in several alternative forms: (a) as a plurality of individual scaffolding structures for each straight run of winding, or (b) as a plurality of individual scaffolding structures linked together, or (c) as a single continuous, flexible coil that is wound together with the stator winding.

Step 7 shows the jump turn 94 extending from the winding turn 30 on the lower level 40 to the upper layer 42 with the help of the mechanical guides 92 provided at the end winding organizer member 64a as shown in FIGS. 5A-5B.

Subsequent to the coiling of the stator winding 18 with the intermittently positioned scaffolding structures 26 around the assembly 104 of each stator tooth 20, the stator 14 is positioned in the required disposition with the rotor 12, and the dielectric coolant fluid 32 is pumped by the pump 50 into the stator slot(s) 22 between the stator teeth 20. The pump 50, being actuated, directs the dielectric coolant fluid 32a into the stator slot(s) 22, particularly through the portals (slots) 78a and 84a formed in the corresponding end-winding organizer member 64a and provides the circulation of the dielectric coolant fluid 32 along the stator slots 22 through the coolant fluid passages 44, 46 (formed between adjacent wiring turns 30 as well as between the wiring turns and the surface of the stator teeth 20), and the grooves 90 (formed at the front surface of the vertical column 72 of the end-winding organizer members 64a, 64b). The coolant fluid 32b, after circulation inside the stator windings 18, exits from the system via the exit portal (slot) 78b (best shown in Steps 1 and 2 of FIG. 10) and the exit portal (slot) 84b provided for this purpose in the end-winding organizer member 64b at the opposite end 66b of the stator tooth 20. The coolant fluid 32b may be further supplied to the pump 50 for further entrance into the system and re-circulation.

Figure 11:
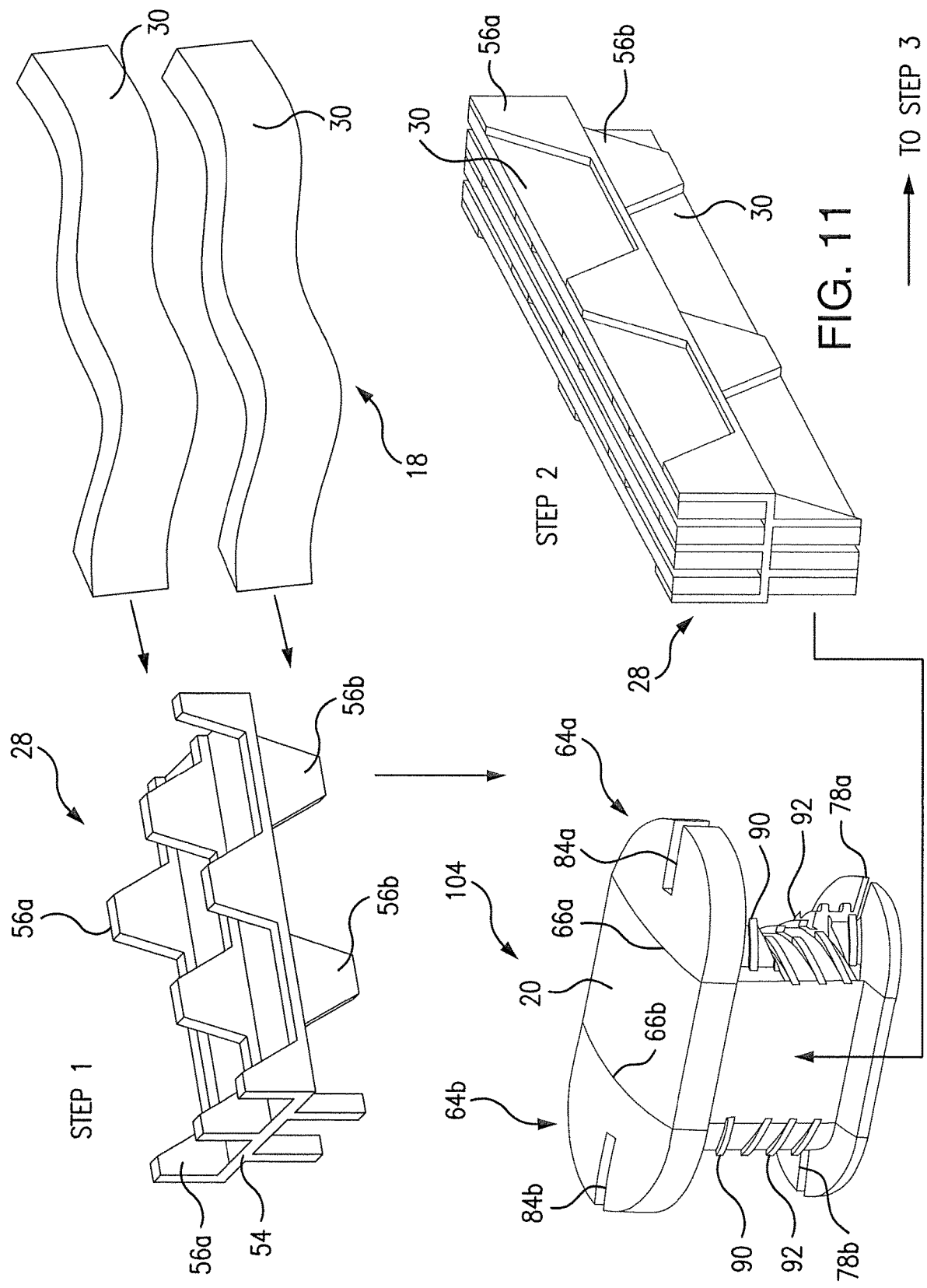
FIG. 11 is representative of an example fabrication process for installation of a stator winding for an electric motor with the subject thermal management system utilizing the monolithic spacing structure.
Figure 11:
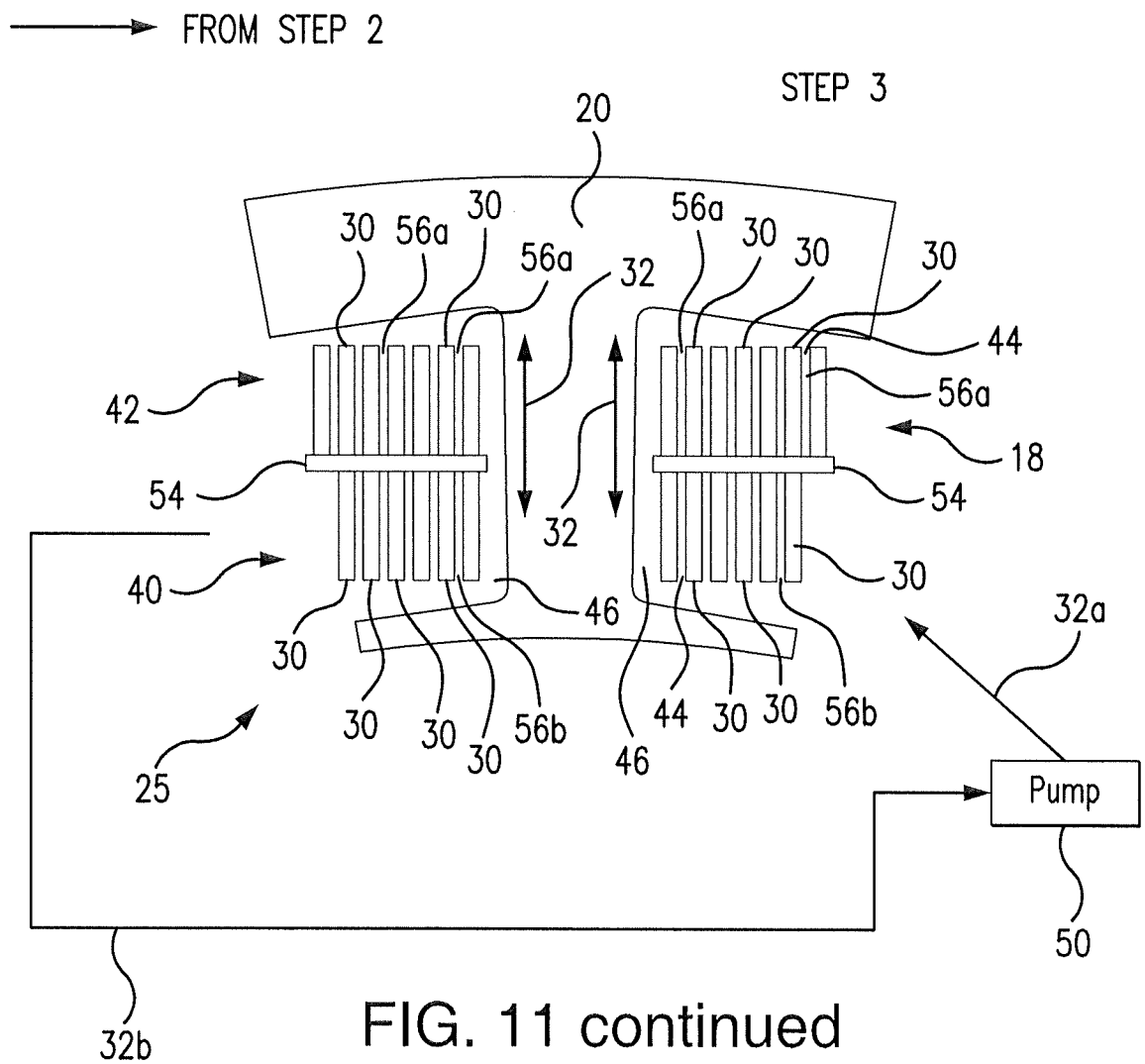

In an alternative process, shown in FIG. 11, the subject thermal management system utilizes the monolithic winding structure 28 detailed in FIGS. 4A-4B. This variation of the spacing structure is based on the use of a complex, one-piece winding structure 28, rather than multiple scaffolding structures 26, to provide the physical separation and to define continuous coolant fluid passages. This structure enables easier manipulation, placement, and retainment of the windings during assembly as shown in FIG. 11.

The process depicted in FIG. 11 begins in Step 1, where the monolithic winding structure 28 is installed with wires of the stator winding 18. The wires are introduced in the upper tier and the lower tier of the monolithic winding structure 28 and are separated from one another by the vertical members 56a and 56b, respectively. Although one wire is shown in Step 1 of FIG. 11 for each tier, it is to be understood that for the exemplary embodiment of the subject process, four wires are installed in the upper tier and three wires are installed in the lower tier. Different number of wires than the exemplary number shown herein may be installed in the monolithic winding structure 28, depending on the requirement to the design of the stator in the electric motor.

In the following Step 2, the monolithic winding structure 28 filled with the wires (winding turns 30) installed therein is wound around the stator tooth and end-winding organizer assembly 104 (fabricated in accordance with the Steps 1-2 of the process shown in FIG. 10). As opposed to the process using the scaffolding structure 26, as shown in FIG. 10, the fabrication of the stator winding utilizing the monolithic winding structure 28 forms both layers 40 and 42 simultaneously.

The process continues till the final structure of the stator winding 18 is wound around the stator tooth and end-winding organizer assembly 104 as shown in Step 3, with the coolant fluid passages 44 and 46 formed for the coolant fluid circulation inside the stator windings 18. Similar to Step 7 of FIG. 10, subsequent to the coiling of the stator winding 18 with the intermittently positioned vertical members 56a and 56b (also referred to herein as tabs) of the monolithic winding structure 28 around the assembly 104 of each stator tooth 20, the stator is positioned in the required disposition with the rotor, and the dielectric coolant fluid 32 is pumped by the pump 50 into the stator slot(s) 22 between the stator teeth 20. The pump 50, being actuated, directs the dielectric coolant fluid 32a into the stator slot(s) 22, particularly through the portals (slots) 78a and 84a on the corresponding end-winding organizer member 64a and provides the circulation of the dielectric coolant fluid 32 along the stator slots 22 through the coolant fluid passages 44,46 (formed between adjacent wiring turns 30 and between the wiring turns and the surface of the stator tooth 20), and the grooves 90 (formed at the front surface of the vertical column 72 of the end-winding organizer members 64). The coolant fluid 32, after circulation inside the stator windings 18, may exit from the system (shown as fluid flow 32b) via the exit portals (slots) 78b, 84b at the end-winding organizer member 64b at the opposite end 66b of the stator tooth 20, and may be further supplied to the pump 50 for further entrance into the system and re-circulation.

Figures 12A, 12B:
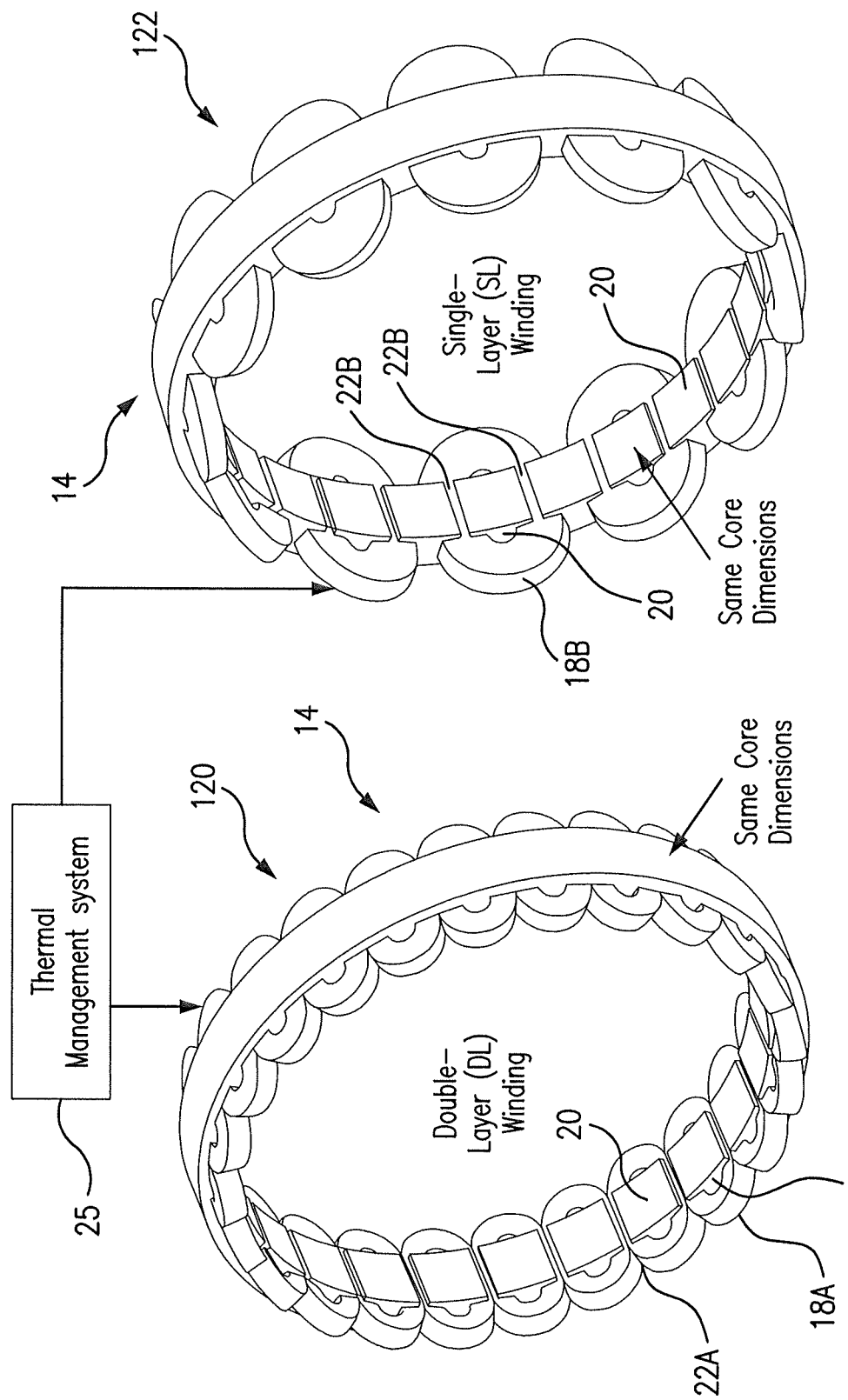
FIGS. 12A-12B depict the subject thermal management system operatively coupled to the stator windings wound around each stator tooth (FIG. 12A) and around each second stator tooth (FIG. 12B).

The present thermal management system 25 is contemplated to be applied to two major classes of concentrated stator windings. FIGS. 12A-12B are representative of these two classes of concentrated windings, where FIG. 12A depicts a "double-layer winding" 120 (the word "layer" here is being used in a different context from the winding layer discussed in the previous paragraphs) with a stator winding 18A around each stator tooth 20. As a result, each stator slot 22A is shared by a coil-side from the stator windings 18A around each of the two adjacent stator teeth 20. FIGS. 1A-1B, 2, and 5A show a double-layer winding embodiment.

FIG. 12B depicts an alternative class of concentrated windings known as a "single-layer winding" 122 in which a stator winding 18B is installed around every second stator tooth 20 in sequence around the circumference of the machine so that half of the stator teeth 20 have no concentrated stator windings around them. This configuration is distinguished by having stator slots 22B that are completely filling by the winding turns of only one stator winding 18B, not two.

Both of these two classes of concentrated windings 18A and 18B shown in FIGS. 12A-12B are contemplated for being used with the subject thermal management system 25 with the stator winding 18 (18A or 18B) wound around each or each second stator tooth 20 in the stator 14.

As presented supra, a unique thermal management system has been developed for directing the flow of a cooling fluid around individual wire turns in stator windings. The subject thermal management system utilizes a scaffolding structure placed between winding turns, which provides: (1) a fluid flow path through stator slots from one end to the other; (2) maximum fluid contact area with the winding turns that may, in some cases, reach all four sides of the rectangular winding turns; (3) minimization of the heat conduction path through low conductivity insulation layers; (4) structural integrity to maintain a physical separation between the winding turns; and (5) high voltage standoff with minimal partial discharge by using a dielectric fluid as the coolant to increase the dielectric standoff capability between winding turns so that the insulation layer thickness around the winding strands can be reduced.

Depending on the type of windings and insulation used, for example, in the case of the Litz wire type of the winding, the coolant may partially flow into the interior of the Litz wire turns, reaching all sides of the Litz wire bundles or even individual wire strands inside the bundles, thus further enhancing the cooling effectiveness of the subject system.

An alternative to the scaffolding structure, a monolithic one-piece winding structure may be also utilized in the subject thermal management system, which is capable of fulfilling the functions of scaffoldings (physical spacing of the wire turns and defining the coolant fluid passages therebetween), but also beneficially enables an easy manipulation, placement, and positioning of the stator windings during assembly.

The present system includes an end-winding organizer that: (1) facilitates the winding turn pattern at the end winding region, including mechanical guiding of jump turns from one layer to an adjacent layer: (2) serves as a scaffolding structure that allows coolant to flow along the inside surfaces of the winding turns that are in direct contact with the end-winding organizer at the end winding regions; and 3) provides slots that serve as the portals for the coolant fluid to enter into the end winding region of the stator winding at one end before flowing down the length of the stator slot and subsequently exiting the stator winding through the end-winding organizer opening at the opposite end of the coil.

To improve the effectiveness of the subject technique, the material used for the scaffolding structure and the monolithic winding structure may be chosen to have a high thermal conductivity to enhance its ability to conduct heat away from the stator windings. This improvement effectively reduces the thermal resistance from the winding turns to the coolant by making it easier for the heat to flow from the winding turns into the scaffolding material which can serve the role of the heat fins.

Although aspects of the present disclosure have been described in connection with specific forms and embodiments thereof, it will be appreciated that various modifications other than those discussed above may be resorted to without departing from the spirit or scope of the present disclosure as defined in the appended claims. For example, functionally equivalent elements may be substituted for those specifically shown and described, certain features may be used independently of other features, and in certain cases, particular locations of the elements may be reversed or interposed, all without departing from the spirit or scope of the present disclosure as defined in the appended claims.

What is claimed is:

1. A thermal management system for cooling of electric motors formed with a stator and a rotor, wherein the stator is configured with at least two stator teeth spaced apart one from another with at least one stator slot defined between the at least two stator teeth, and wherein at least one stator winding is wound around at least one of the at least two stator teeth, the stator winding having at least two winding turns, the system comprising:

at least one elongated spacing structure disposed between said at least two winding turns and separating one winding turn from another to define at least one coolant fluid passage therebetween, said at least one coolant fluid passage extending continuously along substantially an entire lateral surface of each of said at least two winding turns, and at least one dielectric coolant fluid circulating along said at least one coolant fluid passage between said at least two winding turns in contiguous contact with said entire lateral surface of said each of said at least two winding turns;

said at least one elongated spacing structure is further sandwiched between a surface of at least one of the at least two stator tooth and at least one of said at least two winding turns, thereby forming a dielectric coolant passage therebetween;

said at least one stator tooth has two oppositely positioned end winding regions, further comprising a first end-winding organizer member and a second end-winding organizer member, each mounted to a respective one of said two oppositely positioned end winding regions of said at least one stator tooth, each of said first and second end-winding organizer members being configured with a supporting bottom member, an upper member, and a vertical column member extending between and connecting said supporting bottom member and said upper member, wherein each of said supporting bottom member, upper member and vertical column has a respective rear wall and a curved front portion, wherein said respective rear walls of said supporting bottom member, upper member and vertical column member are aligned to one another for matching connection with said respective one of said two oppositely positioned end winding regions of said at least one stator tooth, wherein each of said curved front portions of said supporting bottom member and said upper member is formed with a respective coolant fluid portal, wherein said curved front portion of said vertical column of said first end-winding organizer member is formed with sloped mechanical guides and a first plurality of grooves, and wherein said curved front portion of said vertical column of said second end-winding organizer member is formed with a second plurality of grooves, said first and second pluralities of grooves extending in fluid communication with said coolant fluid portals formed at said curved front portions of said supporting bottom member and said upper member, respectively, and wherein each of said coolant fluid portals formed in the first end-winding organizer member is a coolant portal for entering said at least one dielectric coolant fluid into said at least one coolant fluid passage between said at least two winding turns, between said surface of said at least one stator tooth and said at least one winding turn, and wherein each of said coolant fluid portals formed in the second end-winding organizer member is a coolant fluid portal for exiting said at least one dielectric coolant fluid from said at least one coolant fluid passage between said at least two winding turns, between said surface of said at least one stator tooth and said at least one winding turn.

2. The thermal management system of claim 1, wherein said at least one elongated spacing structure has a scaffolding configuration formed with at least two longitudinal first bars and a plurality of second bars extending in an angular relationship with said at least two longitudinal first bars and connected thereto.

3. The thermal management system of claim 2, wherein said plurality of second bars cross said at least two longitudinal first bars at 90 degrees.

4. The thermal management system of claim 2, wherein said at least two longitudinal first bars are arranged in a first plane, and said plurality of second bars are arranged in a second plane, said second plane being different than said first plane.

5. The thermal management system of claim 2, wherein said at least two longitudinal first bars and said plurality of second bars define an array of openings formed therebetween, said array of openings constituting a continuous path for a flow of said dielectric coolant fluid between said at least two winding turns in contiguous contact with said entire lateral surface of said each of said at least two winding turns.

6. The thermal management system of claim 1, wherein said at least one elongated spacing structure is configured with a base frame and a plurality of first tabs and second tabs extending in spaced apart relationship with one another and in opposite direction from said base frame, wherein said first tabs are disposed in an alternating relationship with said second tabs in an integral coupling with said base frame.

7. The thermal management system of claim 6, wherein said first tabs define a first tier, and wherein said second tabs define a second tier, wherein said at least one stator winding is arranged in at least a first layer and at least a second layer, said first layer being positioned in said first tier, and said second layer being positioned in said second tier, with each of said first and second layers accommodating at least two winding turns, and wherein said at least two winding turns in each of said first and second layers are separated by respective ones of said first and second tabs.

8. The thermal management system of claim 1, wherein said at least one elongated spacing structure is made of an electrically insulating material.

9. The thermal management system of claim 2, wherein said at least one stator winding is arranged in at least two layers, with each of said at least two layers accommodating at least two winding turns of said at least one stator winding, and wherein said at least one elongated spacing structure having said scaffolding configuration is disposed at both surfaces of each of said winding turns of said at least one stator winding.

10. The thermal management system of claim 1, further comprising a pump supplying said at least one dielectric coolant fluid into said at least one stator slot and controllably actuating said at least one dielectric coolant fluid along said at least one coolant fluid passage.

11. A method for thermal management of electric motors formed with a rotor and a stator configured with at least two stator teeth spaced apart one from another with at least one stator slot defined between said at least two stator teeth, the method comprising:
  winding at least two winding turns of at least one stator winding around at least one of at least two stator teeth,
  disposing at least one elongated spacing structure between said at least two winding turns to separate one winding turn from another and define at least one coolant fluid passage therebetween, said at least one coolant fluid passage extending continuously along substantially an entire lateral surface of each of said at least two winding turns, and
  circulating a dielectric coolant fluid along said at least one coolant fluid passage between said at least two winding turns in contiguous contact with said entire lateral surface of said each of said at least two winding turns;
  sandwiching said at least one elongated spacing structure between a surface of at least one stator tooth of said at least two stator teeth and the winding turn to define said coolant fluid passage therebetween;
  attaching a first and a second end-winding organizer members, each to a respective one of a first and second end winding regions of said at least one stator tooth,
  configuring said first and second end-winding organizer members with a supporting bottom member, an upper member, and a vertical column member extending between and connecting said supporting bottom member and said upper member,
  forming each of said supporting bottom member, upper member and vertical column with rear wall and a curved front portion,
  aligning said rear walls of said supporting bottom member, upper member and vertical column member to one another for matching connection with said respective end winding region of said at least one stator tooth,
  forming each of said curved front portions of said supporting bottom member and said upper member with a respective coolant portal,
  shaping said curved front portion of said vertical column with a plurality of grooves extending in fluid communication with said coolant portals formed at said curved front portions of said supporting bottom member and said upper member,
  entering said dielectric coolant fluid in said coolant portals formed in said first end-winding organizer member for entering said dielectric coolant fluid into said at least one coolant fluid passage between said at least two winding turns, said coolant fluid passage formed between said surface of said at least one stator tooth and said winding turn, and said plurality of grooves formed at said curved front portion of said vertical column, and
  exiting the dielectric coolant fluid through said coolant portals formed in said second end-winding organizer member.

12. The method of claim 11, further comprising:
forming said at least one elongated spacing structure in a scaffolding configuration having at least two longitudinal first bars and a plurality of second bars extending in an angularly displaced relationship with said at least two longitudinal first bars and connected thereto,
arranging said at least two longitudinal first bars in a first plane, and said plurality of second bars in a second plane, said second plane being different than said first plane, and
defining an array of openings formed between said first and second bars, said array of openings constituting a continuous passage for a flow of said dielectric coolant fluid between said at least two winding turns in contiguous contact with said entire lateral surface of said each of said at least two winding turns.

13. The method of claim 11, further comprising:
configuring said at least one elongated spacing structure with a base frame and a plurality of first tabs and second tabs extending in a spaced apart relationship with one another and in opposite direction from said base frame, wherein said first tabs are disposed in an alternating relationship with said second tabs in an integral coupling with said base frame.

14. The method of claim 13, further comprising:
defining a first tier by said first tabs and a second tier by said second tabs, arranging said at least two winding turns at least in a first layer in said first tier and at least in a second layer in said second tier, and separating said at least two winding turns in each of said first and second tiers by respective ones of said first and second tabs.

\* \* \* \* \*